United States Patent
Yang et al.

(10) Patent No.: US 11,999,240 B2
(45) Date of Patent: Jun. 4, 2024

(54) RIDING LAWN MOWER

(71) Applicant: Nanjing Chervon Industry Co., Ltd., Nanjing (CN)

(72) Inventors: Dezhong Yang, Nanjing (CN); Xiubo Dai, Nanjing (CN); Lei Wang, Nanjing (CN); Wenqi Zhen, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 292 days.

(21) Appl. No.: 17/556,049

(22) Filed: Dec. 20, 2021

(65) Prior Publication Data

US 2022/0111737 A1 Apr. 14, 2022

Related U.S. Application Data

(63) Continuation of application No. PCT/CN2020/097063, filed on Jun. 19, 2020.

(30) Foreign Application Priority Data

Dec. 30, 2019 (CN) .......................... 201911389143.5

(51) Int. Cl.
*B60L 15/20* (2006.01)
*A01D 34/00* (2006.01)
(Continued)

(52) U.S. Cl.
CPC ............ *B60L 15/20* (2013.01); *A01D 34/006* (2013.01); *A01D 69/02* (2013.01); *H02P 21/12* (2013.01);
(Continued)

(58) Field of Classification Search
CPC .............. B60L 15/20; B60L 2240/461; B60L 2240/421; B60L 2220/58; B60L 2240/423;
(Continued)

(56) References Cited

U.S. PATENT DOCUMENTS

| | | | |
|---|---|---|---|
| 8,668,033 B2 * | 3/2014 | Koike | B62D 11/04 |
| | | | 701/41 |
| 2014/0165523 A1 * | 6/2014 | Schygge | B60L 50/66 |
| | | | 701/33.9 |

FOREIGN PATENT DOCUMENTS

| | | |
|---|---|---|
| CN | 103401493 A | 11/2013 |
| CN | 207219443 U | 4/2018 |

(Continued)

OTHER PUBLICATIONS

Yepes, Alejandro G. et al., "A simple tuning method aimed at optimal settling time and overshoot for synchronous PI current control in electric machines", 2013 IEEE Energy Conversion Congress and Exposition, IEEE, Sep. 15, 2013 (Sep. 15, 2013), pp. 1465-1472, XP032516568, DOI: 10.1109/ECCE.2013.6646878 [retrieved on Oct. 24, 2013].

(Continued)

*Primary Examiner* — James A Shriver, II
*Assistant Examiner* — Michael T. Walsh
(74) *Attorney, Agent, or Firm* — Greenberg Traurig, LLP

(57) ABSTRACT

A riding lawn mower includes a running assembly, a power output assembly, a power supply device, a driver circuit, an operating device, and a control module. The running assembly includes running wheels and a first motor for driving the running wheels. The operating device is configured to set at least one of target torque or a target rotational speed of the first motor. The control module is configured to output a control signal to the driver circuit to make an input current or an input voltage of the first motor vary with a rotor position of the first motor and make an actual torque of the first motor reach or basically reach the target torque within a preset time.

20 Claims, 14 Drawing Sheets

(51) Int. Cl.
*A01D 69/02* (2006.01)
*H02P 21/12* (2016.01)
*H02P 21/18* (2016.01)
*H02P 21/22* (2016.01)
*A01D 34/66* (2006.01)
*A01D 34/78* (2006.01)
*A01D 101/00* (2006.01)

(52) U.S. Cl.
CPC .............. *H02P 21/18* (2016.02); *H02P 21/22* (2016.02); *A01D 34/66* (2013.01); *A01D 34/78* (2013.01); *A01D 2101/00* (2013.01); *B60L 2240/429* (2013.01); *B60L 2240/461* (2013.01)

(58) Field of Classification Search
CPC ... B60L 2240/80; A01D 34/006; A01D 69/02; A01D 34/66; A01D 34/78; H02P 21/12; H02P 21/18; H02P 21/22; H02P 5/74; H02P 21/141; H02P 6/08; Y02T 10/72
See application file for complete search history.

(56) References Cited

FOREIGN PATENT DOCUMENTS

| CN | 108418502 | A | | 8/2018 | |
| --- | --- | --- | --- | --- | --- |
| CN | 108443419 | A | * | 8/2018 | |
| CN | 108443419 | A | | 8/2018 | |
| CN | 208159349 | U | | 11/2018 | |
| CN | 208159349 | U | * | 11/2018 | |
| CN | 109067285 | A | | 12/2018 | |
| CN | 109861605 | A | * | 6/2019 | |
| CN | 109861605 | A | | 6/2019 | |
| EP | 2564684 | A1 | | 3/2013 | |
| EP | 2639128 | A2 | | 9/2013 | |
| EP | 2639128 | A2 | * | 9/2013 | ........... A01D 34/006 |
| EP | 3326443 | A1 | | 5/2018 | |
| EP | 3401153 | A1 | | 11/2018 | |

OTHER PUBLICATIONS

Anonymous, Sensorless Field Oriented Control (FOC) for a Permanent Magnet Synchronous Motor (PMSM) Using a PLL Estimator and Equation-based Flux Weakening (FW), Aug. 1, 2018 (Aug. 1, 2018), pp. 1-16, XP055929552, Retrieved from the Internet: URL:https://ww.1.microchip.com/downloads/en/Appnotes/Sensorless-FOC-For-PMSM-using-PLL-Estimator-FW-AN-DS00002520C.pdf [retrieved on Jun. 9, 2022].
EPO, extended European search report issued on EP publication No. EP3979488A1, dated Jun. 20, 2022, 10 pages.
ISA/CN, International Search Report issued on PCT application No. PCT/CN2020/097063, dated Sep. 4, 2020, 4 pages.
ISA/CN, English translation of International Search Report issued on PCT application No. PCT/CN2020/097063, dated Sep. 4, 2020, 3 pages.

* cited by examiner

RIDING LAWN MOWER

RELATED APPLICATION INFORMATION

This application is a continuation of International Application Number PCT/CN2020/097063, filed on Jun. 19, 2020, through which this application also claims the benefit under 35 U.S.C. § 119(a) of Chinese Patent Application No. CN 201910543909.4, filed on Jun. 21, 2019, and Chinese Patent Application No. CN 201911389143.5, filed on Dec. 30, 2019, all of which are incorporated herein by reference in their entireties.

BACKGROUND

A riding lawn mower is popular in a golf course or a grass field with a relatively large area. A user may sit on the riding lawn mower and freely control the mower to perform mowing in any direction by manipulating an operating lever. Compared with a hand-push lawn mower, it is less laborious to use the riding lawn mower.

The user pushes an operating device to set a target speed of a motor for driving a running wheel. A control unit can acquire the target rotational speed and then output a control signal to a first motor for driving the running wheel according to the target rotational speed, so as to output torque to the running wheel, thereby driving the running wheel to move at the set target speed. However, hysteresis exists in a motor control method in the related art, and a torque response speed of the motor is slow so that the motor may possibly be unable to reach the target speed set by the operating device within a preset time, which may also cause misjudgment of the operator and lead to jitters when the riding lawn mower moves, leading to a poor operating experience. When the torque response speed of the motor exceeds a range of 100 ms to 200 ms, an operator can already feel that the torque response speed of the motor is slow. In addition, due to the slow torque response speed of the motor, on one hand, it may cause the operator to misjudge and misuse the riding lawn mower and thus cause jitters; on the other hand, due to the hysteresis of the response of the motor, the mower may slip backward during a climbing process, which is dangerous.

For the riding lawn mower, the desired effect is as follows: after the target rotational speed and target torque of the motor are set by the operating device, the torque response speed of the first motor is faster so that the first motor can reach the target rotational speed stably and quickly, thereby improving the user experience. In a control system in the related art, the torque response speed of the motor is slow so that the target rotational speed and the target torque cannot be reached in a relatively short time, leading to a poor user experience and a safety risk.

SUMMARY

In one example, a riding lawn mower includes a rack, a seat, a wheel set, a running motor, a plurality of battery packs, an operating assembly, a driver circuit, a first detection device, a current detection module, and a control module. The seat is disposed above the rack and configured to support an operator. The wheel set is disposed below the rack and configured to drive the rack to move, where the wheel set includes at least two driving wheels. The running motor is configured to drive the at least two driving wheels to rotate and includes a stator and a rotor. The plurality of battery packs are at least configured to supply a power source to the running motor. The operating assembly is disposed above the rack and at least configured to be operated by the operator to set a target state of the riding lawn mower and one of a target rotational speed or target torque of the running motor, where the target state includes one of a forward state, a stop state, or a backward state. The driver circuit is electrically connected to the running motor and configured to distribute electric power of the plurality of battery packs to multiphase windings on the stator in a preset logical relationship so that the driver motor is capable of generating continuous torque. The first detection device is configured to detect an actual measured rotational speed of each of the at least two driving wheels in real time. The current detection module is configured to detect three-phase currents of the driver motor. The control module is configured to: receive the actual measured rotational speed sent by the first detection device and the target rotational speed set by the operating assembly; and based on the actual measured rotational speed of each of the at least two driving wheels sent by the first detection device at a first preset time interval, one of the target rotational speed or the target torque set by the operating assembly, and a rotor position of the driver motor, perform dynamic adjustment on currents applied to the multiphase windings to make the driver motor reach or basically reach the target torque set by the operating assembly within a preset time, where a data refresh rate of the first detection device is between 50 µs/time and 10 ms/time.

In one example, a lawn care vehicle includes a rack, a seat, a wheel set, a running motor, a plurality of battery packs, an operating assembly, a driver circuit, a first detection device, a current detection module, and a control module. The seat is disposed above the rack and configured to support an operator. The wheel set is disposed below the rack and configured to drive the rack to move, where the wheel set includes at least two driving wheels. The running motor is configured to drive the at least two driving wheels to rotate and includes a stator and a rotor. The plurality of battery packs are at least configured to supply a power source to the running motor. The operating assembly is disposed above the rack and at least configured to be operated by the operator to set a target state of the lawn care vehicle and one of a target rotational speed or target torque of the running motor, where the target state includes one of a forward state, a stop state, or a backward state. The driver circuit is electrically connected to the running motor and configured to distribute electric power of the plurality of battery packs to multiphase windings on the stator in a preset logical relationship so that the driver motor is capable of generating continuous torque. The first detection device is configured to detect an actual measured rotational speed of each of the at least two driving wheels in real time. The current detection module is configured to detect three-phase currents of the driver motor. The control module is configured to: receive the actual measured rotational speed sent by the first detection device and the target rotational speed set by the operating assembly; and based on the actual measured rotational speed of each of the at least two driving wheels sent by the first detection device at a first preset time interval, one of the target rotational speed or the target torque set by the operating assembly, and a rotor position of the driver motor, perform dynamic adjustment on currents applied to the multiphase windings to make the driver motor reach or basically reach the target torque set by the operating assembly within a preset time.

In one example, a riding lawn mower includes a running assembly, a power output assembly, a power supply device, a driver circuit, an operating device, and a control module.

The running assembly includes running wheels and a first motor for driving the running wheels, where the first motor includes a stator and a rotor. The power output assembly includes a blade for mowing and a second motor for driving the blade. The power supply device is at least configured to supply electric power to the first motor. The driver circuit is configured to load the electric power of the power supply device to the first motor. The operating device is configured to set at least one of target torque or a target rotational speed of the first motor. The control module is configured to output a control signal to the driver circuit to make an input current or an input voltage of the first motor vary with a rotor position of the first motor and make actual torque of the first motor reach or basically reach the target torque within a second preset time, where the second preset time is less than 100 ms.

In one example, the operating device is further configured to set the target rotational speed of the first motor; an actual rotational speed of the first motor reaches or basically reaches the target rotational speed within a preset time, where the preset time is less than 800 ms.

In one example, the riding lawn mower further includes a target rotational speed detection module associated with the operating device and configured to detect the target rotational speed of the first motor set by the operating device.

In one example, the riding lawn mower further includes a current detection module, a target rotational speed detection module, and an actual rotational speed detection module. The current detection module is configured to detect a current of the first motor and connected to the first motor and the control module. The target rotational speed detection module is configured to detect the target rotational speed of the first motor set by the operating device, associated with the operating device, and connected to the control module. The actual rotational speed detection module is configured to detect an actual rotational speed of the first motor, associated with the first motor, and connected to the control module.

In one example, the riding lawn mower further includes a current detection module, a target rotational speed detection module, and an actual rotational speed estimation module. The current detection module is configured to detect a current of the first motor and connected to the first motor and the control module. The target rotational speed detection module is configured to detect the target rotational speed of the first motor set by the operating device, associated with the operating device, and connected to the control module. The actual rotational speed estimation module is configured to estimate an actual rotational speed of the first motor according to the current of the first motor detected by the current detection module and connected to the current detection module and the control module.

In one example, the riding lawn mower further includes a rotor position detection module or a rotor position estimation module configured to acquire a rotor position of the first motor, where the rotor position detection module or the rotor position estimation module is connected to the control module; the control module is configured to output a control signal varying with the rotor position according to the rotor position.

In one example, the target rotational speed detection module and the control module are connected through a bus.

In one example, a communication frame rate of the bus has a range of 100 Hz to 3000 Hz.

In one example, a first preset time is less than 60 ms.

In one example, the target rotational speed detection module includes a sensor, and a data refresh rate of the sensor has a range of 50 μs/time to 10 ms/time.

In one example, a first preset time is less than 10 ms.

In one example, the target rotational speed detection module includes a sensor, and a data refresh rate of the sensor has a range of 50 μs/time to 10 ms/time.

In one example, a first preset time is less than 60 ms.

In one example, an included angle between a stator flux linkage and a rotor flux linkage of the first motor is 90°.

In one example, an included angle between a stator flux linkage and a rotor flux linkage has a range of 90° to 135°.

In one example, the input voltage of the first motor varies in a sine wave or a saddle wave, and the input current of the first motor varies in a sine wave.

In one example, the operating device includes at least one bracket, an operating lever, and a pivoting combination.

In one example, the at least one bracket is capable of being installed on the riding lawn mower.

In one example, the operating lever is configured to rotate around a first pivot at least in a first direction.

In one example, the pivoting combination includes a first pivoting assembly. The first pivoting assembly has the first pivot and is used for pivotably installing the operating lever on the at least one bracket so that the operating lever is capable of rotating around the first pivot in the first direction.

In one example, the target rotational speed detection module includes a position detection module set. The position detection module is associated with the operating lever and configured to detect a position of the operating lever in the first direction. The position of the operating lever in the first direction corresponds to the target rotational speed of the first motor.

In one example, the operating device includes a steering wheel and a speed lever, where the target rotational speed detection module is associated with the steering wheel and/or the speed lever and configured to detect the target rotational speed and the target torque of the first motor set by the steering wheel and/or the speed lever.

In one example, the control module includes a first rotational speed loop configured to generate a target current of the first motor according to the target rotational speed and the actual rotational speed of the first motor.

In one example, the control module further includes a current distribution unit, a current conversion unit, a first current loop, a second current loop, and a control signal generation unit. The current distribution unit is configured to distribute a direct axis target current and a quadrature axis target current according to a target current of the first motor generated by a first rotational speed loop. The current conversion unit is configured to generate a direct axis actual current and a quadrature axis actual current according to an actual current of the first motor and the rotor position of the first motor. The first current loop is configured to generate a first voltage adjustment quantity according to the direct axis target current and the direct axis actual current. The second current loop is configured to generate a second voltage adjustment quantity according to the quadrature axis target current and the quadrature axis actual current. The control signal generation unit is configured to generate a control signal according to the first voltage adjustment quantity and the second voltage adjustment quantity, where the control signal is configured to control the driver circuit.

In one example, the control module includes a second rotational speed loop configured to generate the target torque of the first motor according to the target rotational speed and the actual rotational speed of the first motor.

In one example, the control module further includes a torque loop, a flux linkage loop, and a control signal generation unit. The torque loop is configured to generate a first adjustment quantity according to the target torque and the actual torque of the first motor. The flux linkage loop is configured to generate a second adjustment quantity according to a target stator flux linkage and an actual stator flux linkage of the first motor. The control signal generation unit is configured to generate a control signal according to the first adjustment quantity and the second adjustment quantity, where the control signal is configured to control the driver circuit.

In one example, a dead zone interval exists between an operating position of the operating device and the target rotational speed of the first motor, where the target rotational speed of the first motor is constant in the dead zone interval.

In one example, a dead zone interval exists between an operating position of the operating device and the target torque of the first motor, where the target torque of the first motor is constant in the dead zone interval.

The riding lawn mower in the present application can improve the response speed of the motor driving the running wheels and has good safety so that a user has a good operating experience.

DETAILED DESCRIPTION

Figure 1:
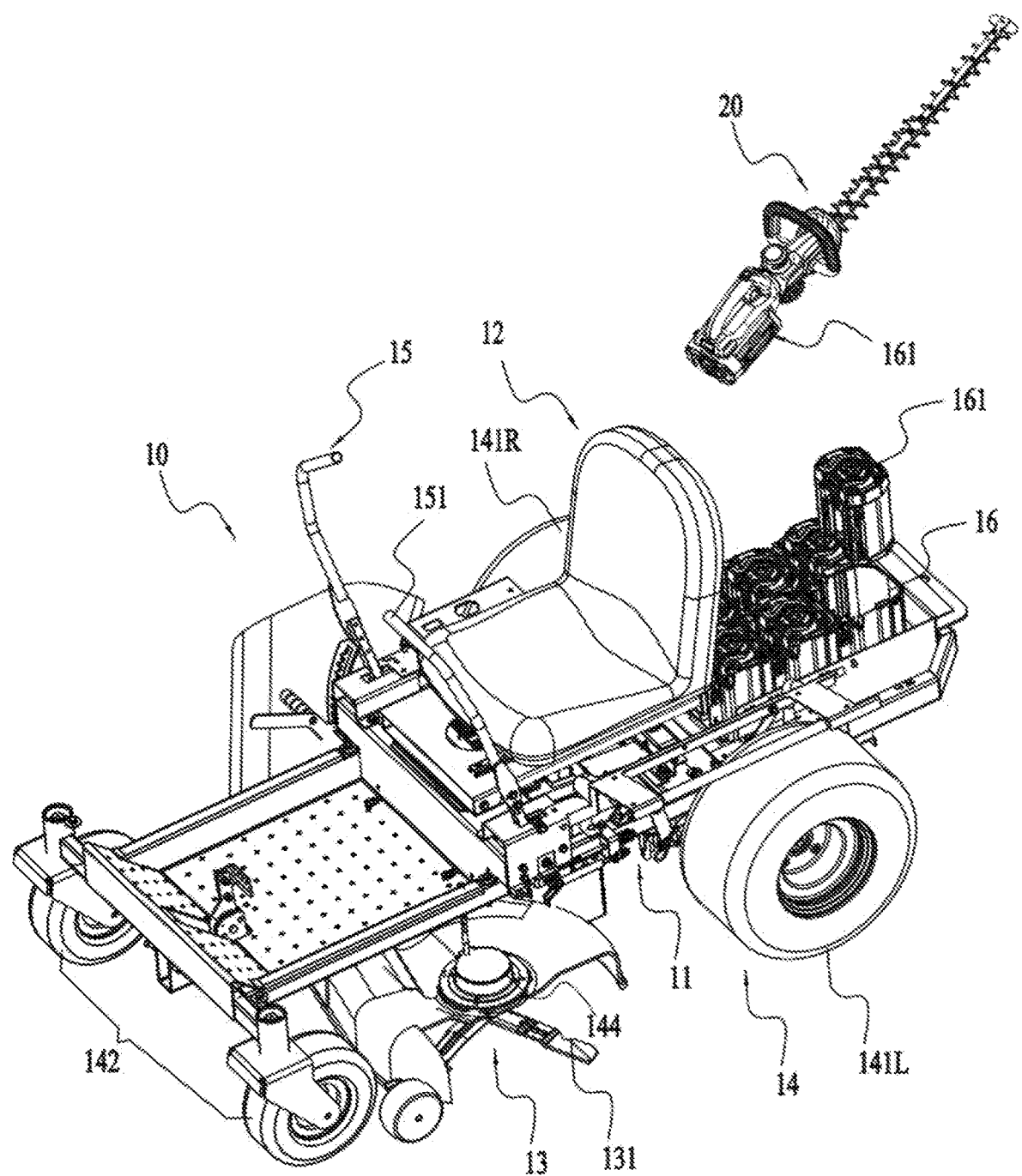
FIG. 1 is an external view of a riding lawn mower as an example.

Referring to FIG. 1, as an example, a riding lawn mower 10 includes a rack 11, a seat 12, a power output assembly 13, a running assembly 14, an operating device 15, and a power supply device 16.

The rack 11 is configured to bear the seat 12 and extend at least partially in a front-and-rear direction; the seat 12 is used for an operator to sit on and installed on the rack 11. The power output assembly 13 is connected to the rack 11 and includes an output piece configured to output power to achieve mechanical functions. For example, in this example, the output piece may be a blade 131 configured to achieve a mowing function. The power output assembly 13 further includes a second motor 144 configured to drive the blade 131 to rotate at a high speed. The power output assembly 13 may include more than one blade 131, and correspondingly, the number of the second motors 144 may correspond to the number of the blades 131.

Figure 5:
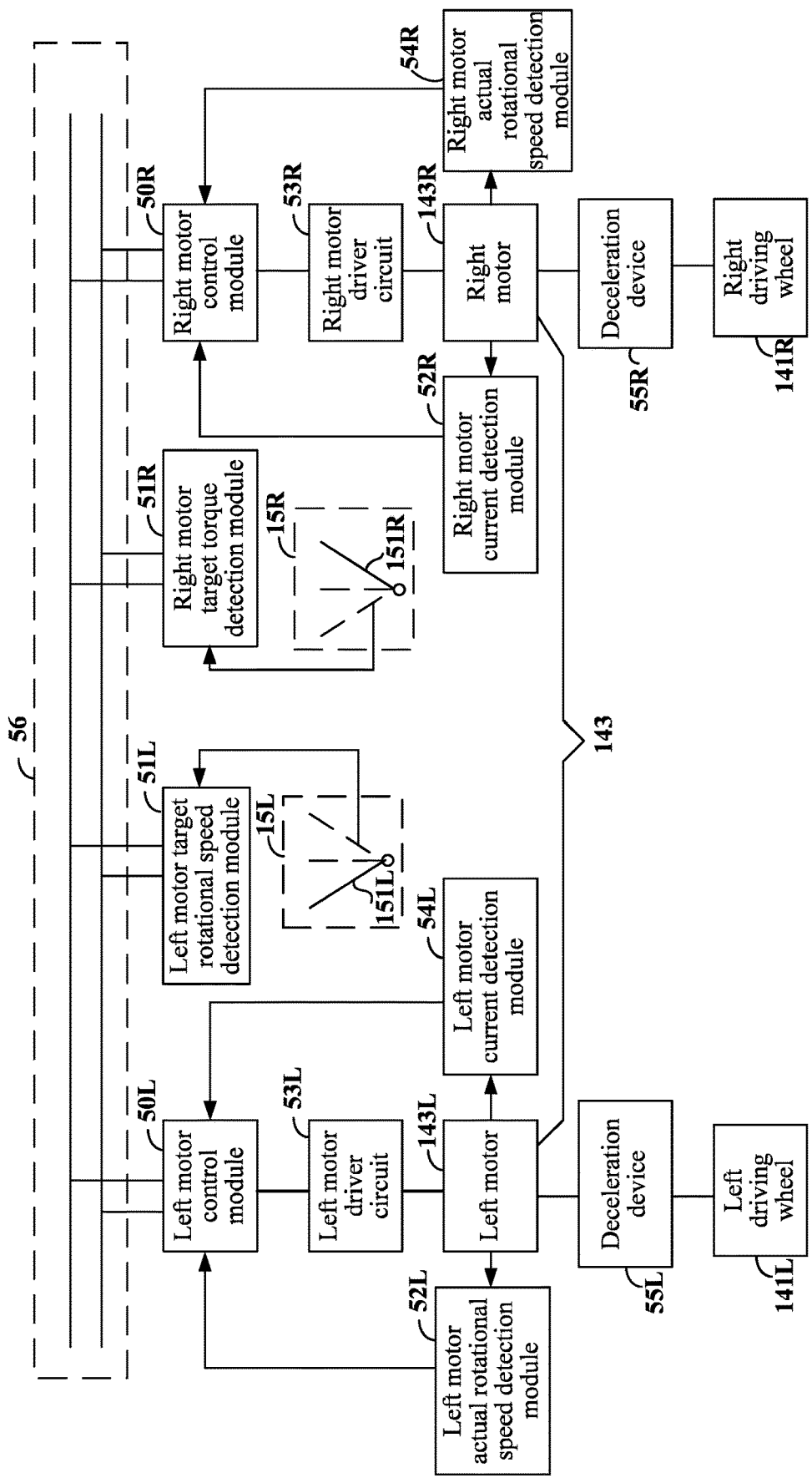
FIG. 5 is a block diagram of a control system of a first motor including a left motor and a right motor of a riding lawn mower.

The running assembly 14 is configured to enable the riding lawn mower 10 to move on the lawn. The running assembly 14 includes a wheel set, where the wheel set is disposed below the rack and can drive the rack to move. The wheel set includes at least two driving wheels such as a left driving wheel 141L and a right driving wheel 141R. The wheel set further includes running wheels 142 (a left running wheel 142L and a right running wheel 142R). The running assembly 14 further includes a left running motor 143L for driving the left driving wheel 141L and a right running motor 143R for driving the right driving wheel 141R (as shown in FIG. 5).

In this manner, when the left running motor 143L and the right running motor 143R drive the left driving wheel 141L and the right driving wheel 141R at different rotational speeds, respectively, a speed difference exists between the left driving wheel 141L and the right driving wheel 141R, so as to steer the riding lawn mower 10.

The power supply device 16 is configured to supply electric power to the riding lawn mower 10. Exemplarily, the power supply device 16 is configured to supply power to a first motor 143 (the left running motor 143L and the right running motor 143R), a second motor 144, and other electronic components or electronic assemblies on the riding lawn mower 10. In some examples, the power supply device 16 is disposed on a rear side of the seat 12 on the rack 11. The power supply device 16 includes multiple battery packs 161 configured to supply a power source to the riding lawn mower 10, and at least one battery pack 161 is further configured to supply a power source to another power tool 20.

The operating device 15 is at least configured to set a target rotational speed of the first motor 143 and then set a target state of the riding lawn mower 10. The target state of the riding lawn mower 10 includes a forward state, a backward state, a forward speed, a backward speed, a zero speed, a ready-to-operate state (including electronic module power-on, etc.), or an operation-exiting state (that is, a parking state) of the riding lawn mower 10. The operator can use the operating device 15 to control the riding lawn mower 10 to move or determine an operation state of the riding lawn mower 10.

In this example, the operating device 15 is at least configured to be used by the operator to control the first motor 143 in the running assembly 14 to control the riding lawn mower 10 to move on the lawn. Optionally, the operating device 15 is at least configured to set the target rotational speed of the first motor 143. Exemplarily, the operating device 15 is further used by the operator to make the riding lawn mower 10 enter or exit the operation state. In this example, two operating devices 15 such as a right operating device 15R and a left operating device 15L are provided and configured to control the right running motor 143R and the left running motor 143L, respectively, so as to drive the right driving wheel 141R and the left driving wheel 141L, respectively. The two operating devices 15 have the same components and are disposed on a right hand side and a left hand side of the operator sitting on the seat 12, respectively, which facilitates the operation.

Figure 2:
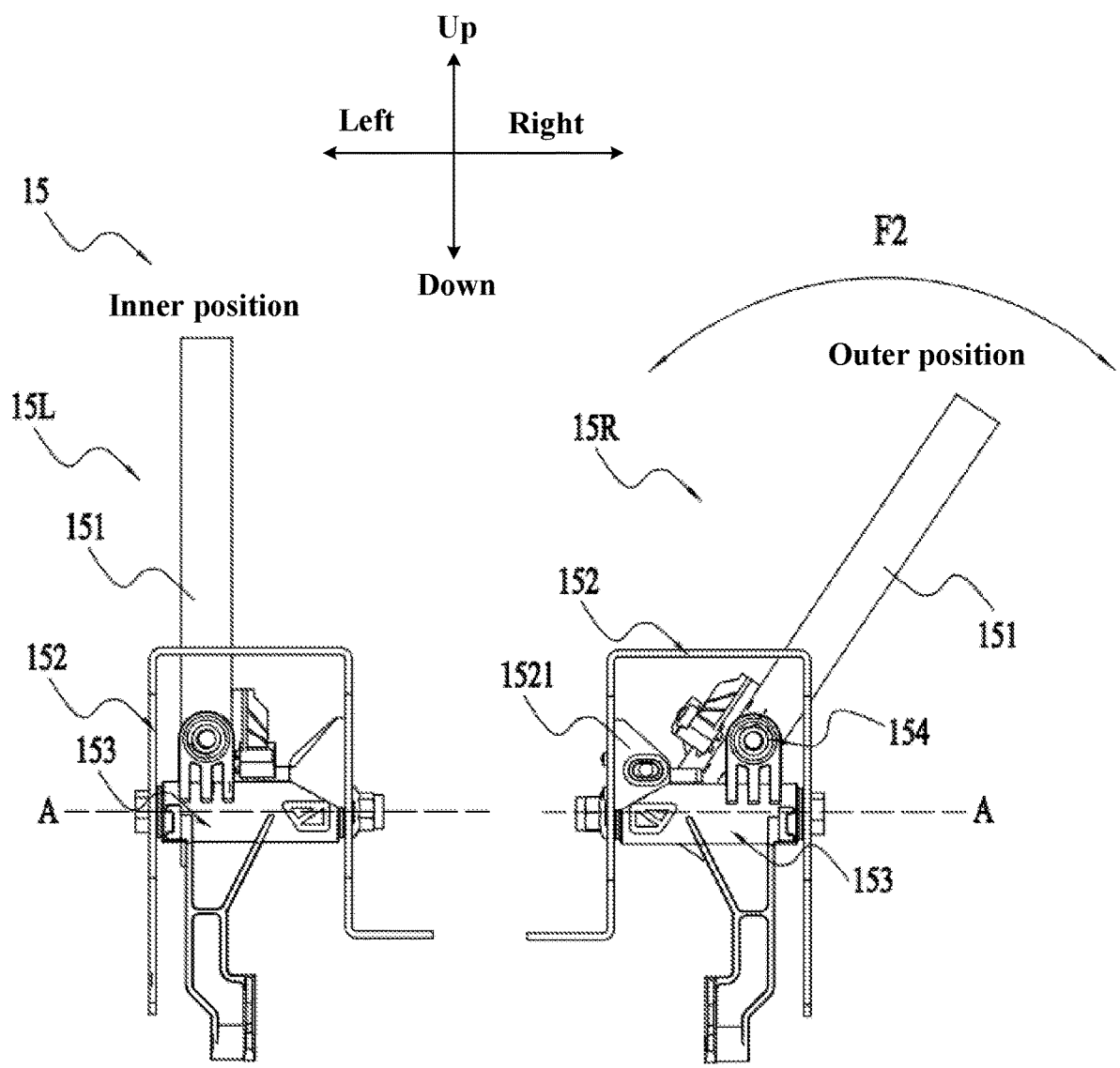
FIG. 2 is an operating device of a riding lawn mower as an example.
Figure 3:
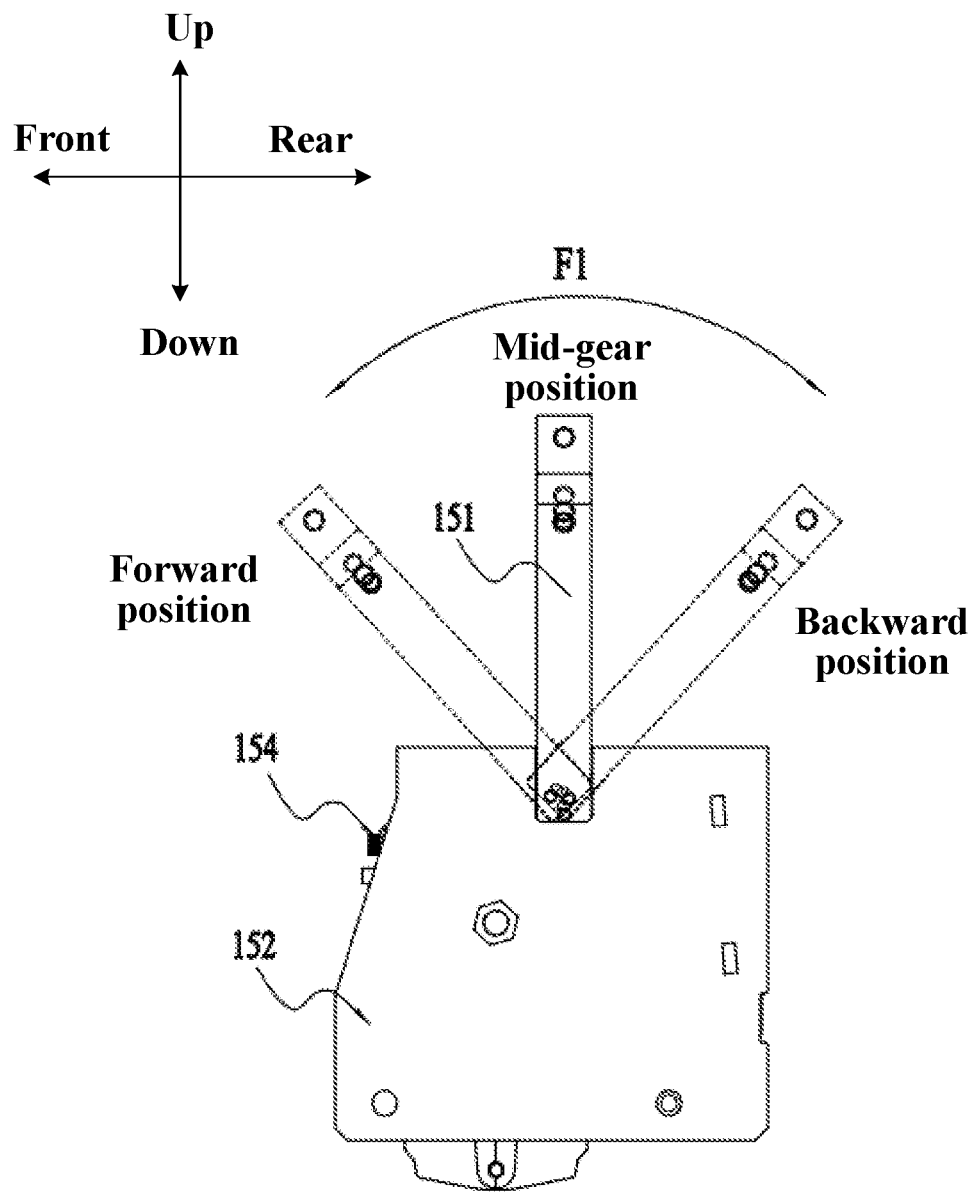
FIG. 3 is the operating device in FIG. 2 from another angle.
Figure 4:
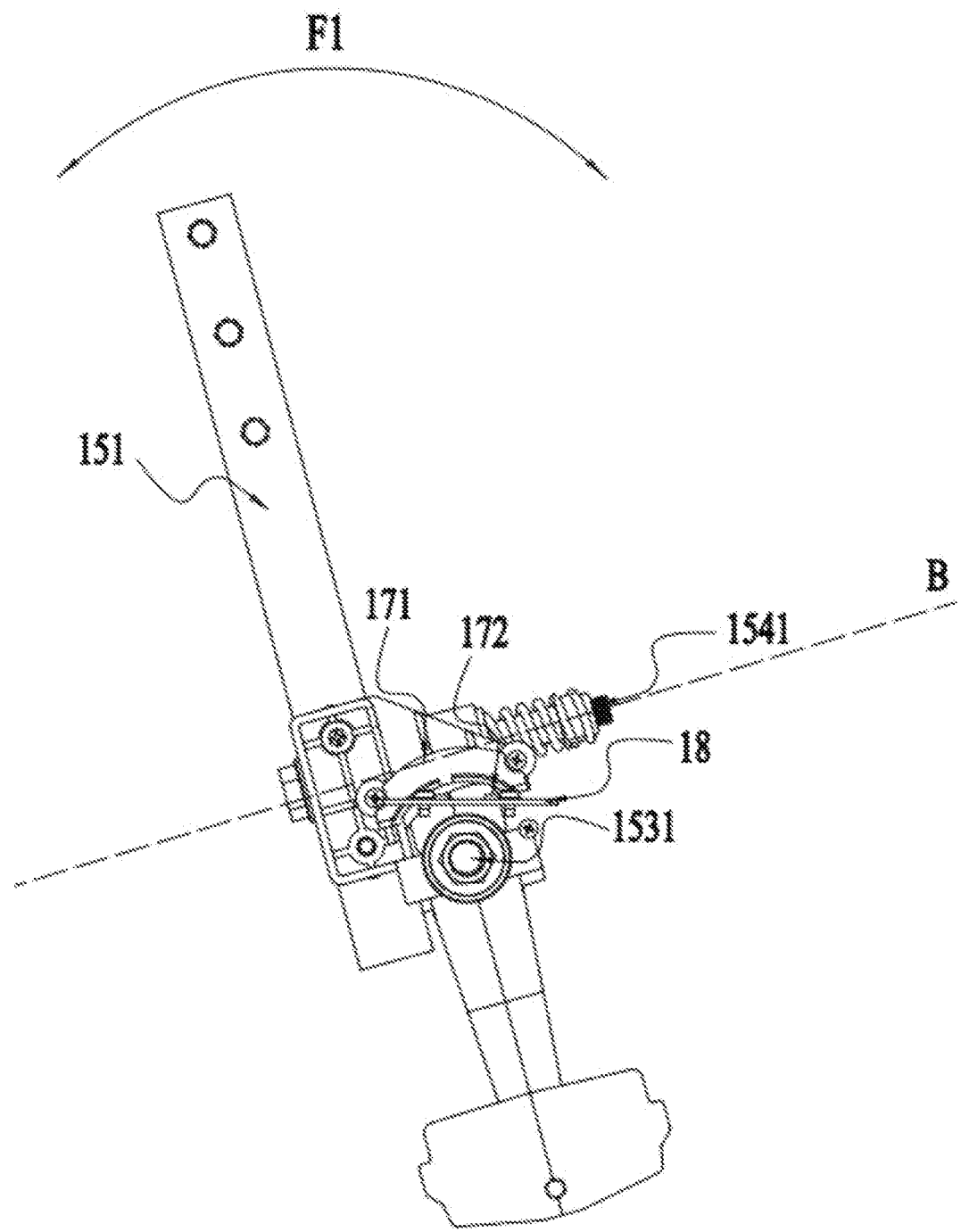
FIG. 4 is a partial structural view of the operating device in FIG. 2.

The left operating device 15L and the right operating device 15R have the same structure and composition. The structure and composition of the operating device will be described below. For ease of description, the operating device 15 is used for description. Referring to FIGS. 2 to 4, as a possible example, the operating device 15 includes at least one bracket 152 that can be installed on the riding lawn mower 10. Optionally, the bracket 152 is fixedly installed on the rack 11; an operating lever assembly includes an operating lever 151 and a pivoting combination. The operating lever 151 is configured to be capable of rotating around a first axis A in a first direction F1 at a forward position, a mid-gear position, and a backward position and rotating around a second axis B in a second direction F2 at an inner position and an outer position. The pivoting combination is used for pivotably installing the operating lever 151 on the bracket 152 so that the operating lever 151 can rotate around the first axis A in the first direction F1 and rotate around the second axis B in the second direction F2. In this example, for the operator sitting on the seat 12, the second axis B and the first direction F1 extend in a front-and-rear direction of the operator, and the first axis A and the second direction F2 extend in a left-and-right direction of the operator.

The pivoting combination includes a first pivoting assembly 153 installed on the bracket 152. The first pivoting assembly 153 includes a first pivot 1531 fixedly installed on a bracket 152, where the first pivot 1531 defines the first axis A. In some examples, the first pivoting assembly 153 further includes a sleeve. The sleeve partially surrounds the first pivot 1531 and can rotate around the first pivot 1531. The first pivoting assembly 153 allows the operating lever 151 to rotate around the first axis A in the first direction F1, and the first axis A is an axis of the first pivot 1531. When the operating lever 151 rotates around the first axis A in the first direction F1 between the forward position, the mid-gear position, and the backward position, the operating lever 151 drives the first pivoting assembly 153 to rotate around the first axis A in the first direction F1.

A position of the operating lever 151 in the first direction F1 corresponds to the corresponding target rotational speed and target state of the first motor 143 set by the operator, where the target state includes the forward state, the backward state, and the zero speed state. In this example, the position in the first direction F1 include the forward position, the mid-gear position, and the backward position, which correspond to the forward state, the zero speed state, and the backward state of the riding lawn mower 10, respectively. The operating lever 151 provides multiple target travelling speeds in a forward direction between the forward position and the mid-gear position and provides multiple target travelling speeds in a backward direction between the mid-gear position and the backward position. The operator sets the target rotational speed and the target state of the first motor 143 by pushing the operating lever 151 to rotate to different positions in the first direction F1.

Optionally, the pivoting combination further includes a second pivoting assembly 154 installed on the first pivoting assembly 153. The second pivoting assembly 154 includes a second pivot 1541 fixedly installed on the first pivoting assembly 153, where the second pivot 1541 defines the second axis B. Optionally, the second pivot 1541 of the second pivoting assembly 154 is fixedly installed in an installation hole disposed on the sleeve of the first pivoting assembly 153. The operating lever 151 is pivotally installed on the second pivot 1541 and can rotate around the second pivot 1541. The operating lever 151 is provided with a through hole for the second pivot 1541 to pass through, and the operating lever 151 can rotate around the second pivot 1541. The second pivoting assembly 154 allows the operating lever 151 to rotate around the second axis B in the second direction F2, and the second axis B is an axis of the second pivot 1541. When the operating lever 151 rotates around the second pivot 1551 in the second direction F2 between the inner position and the outer position, the operating lever 151 drives the second pivoting assembly 155 to rotate around the second pivot 1551 in the second direction F2.

The operator sets the target state of the riding lawn mower by pushing the operating lever 151 to rotate to different positions (the inner position or the outer position) in the second direction F2, where the target state includes the operation state (that is, a ready state or the zero speed state) and an non-operation state (that is, the parking state). The inner position of the operating lever 151 in the second direction F2 is consistent with the mid-gear position of the operating lever 151 in the first direction F1, and a user may power on the riding lawn mower 10 at the outer position.

Optionally, a target travelling direction of the riding lawn mower 10 is determined by a target travelling speed difference indicated by the user operating a left operating lever 151L and a right operating lever 151R. That is, if both the left operating lever 151L and the right operating lever 151R are pushed in the forward direction and the target travelling speed given by the left operating lever 151L is greater than the target travelling speed given by the right operating lever 151R, then the riding lawn mower moves forward and turns to the right; if both the left operating lever 151L and the right operating lever 151R are pushed in the forward direction and the target travelling speed given by the left operating lever 151L is less than the target travelling speed given by the right operating lever 151R, then the riding lawn mower 10 moves forward and turns to the left; if both the left operating lever 151L and the right operating lever 151R are pushed in the forward direction and the target travelling speed given by the left operating lever 151L is the same as or substantially the same as the target travelling speed given by the right operating lever 151R, then the riding lawn mower 10 moves forward at a substantially constant speed which is the target travelling speed given by the left and right operating levers. Similarly, if both the left operating lever 151L and the right operating lever 151R are pushed in the backward direction and a difference exists between the target travelling speed given by the left operating lever 151L and the target travelling speed given by the right operating lever 151R, then the riding lawn mower 10 moves and turns according to the difference between the target travelling speed given by the left operating lever 151L and the target travelling speed given by the right operating lever 151R. Since the rotational speed of the motor is related to the torque, while the operating device 15 sets the target rotational speed of the first motor 143, the operating device 15 sets the target torque of the first motor correspondingly.

Referring to a block diagram of a motor control system of the riding lawn mower 10 shown in FIG. 5, the motor control system includes a left motor control system and a right motor control system. The function and composition of the left motor control system are the same as or similar to the function and composition of the right motor control system. The left motor control system is used as an example and mainly includes a left motor control module 50L, a left motor target rotational speed detection module 51L, a left motor actual rotational speed detection module 52L, a left motor driver circuit 53L, a left motor current detection module 54L, and the left running motor 143L.

The left motor control module 50L is configured to control the operation of the left running motor 143L and connected to the left motor target rotational speed detection module 51L, the left motor actual rotational speed detection module 52L, the left motor driver circuit 53L, and the left motor current detection module 54L. The left motor control module 50L is configured to adjust a control quantity of the left running motor 143L according to detection signals of the left motor target rotational speed detection module 51L, the left motor actual rotational speed detection module 52L, and the left motor current detection module 54L and output a control signal to the left motor driver circuit 53L, thereby controlling the left motor driver circuit 53L to make the left motor driver circuit 53L drive the left running motor 143L to reach or basically reach the target rotational speed set by the left operating device 15L as soon as possible. The control quantity of the left running motor 143L includes an input voltage and/or an input current of the left running motor 143L.

The left motor target rotational speed detection module 51L is associated with the left operating device 15L and configured to detect a state of the left operating device 15L and output the state of the left operating device 15L to the left motor control module 50L so that the left motor control module 50L can obtain the target rotational speed of the left running motor 143L according to a detection result of the left motor target rotational speed detection module 51L. In this example, the left motor target rotational speed detection module 51L is associated with the left operating lever 151L and configured to detect a position of the left operating lever 151L. The left motor target rotational speed detection module 51L includes an angle sensor or a position sensor configured to detect an angle of rotation or a position after rotation of the operating lever 151 of the operating device 15.

The left motor actual rotational speed detection module 52L is associated with the left running motor 143L and configured to detect an actual rotational speed of the left running motor 143L. In an example, the left motor actual rotational speed detection module 52L includes a speed detection sensor disposed near or inside the left running motor 143L to acquire the actual rotational speed of the left running motor 143L. For example, a photoelectric sensor disposed near the left running motor 143L can acquire the actual rotational speed of the left running motor 143L. For another example, a Hall sensor disposed near the rotor inside the left running motor 143L can acquire the actual rotational speed of the left running motor 143L according to the angle of rotation of the rotor.

However, in some cases where the first motor 143 operates at a high speed and/or high temperature, or a first running wheel 141 operates at a high speed and/or high temperature, or the riding lawn mower operates at high temperature, the detection accuracy of the sensor will be affected, and the speed detection sensor even fails to perform detecting. Therefore, to solve this problem, as another example, the left motor actual rotational speed detection module 52L does not include a sensor, and the left motor actual rotational speed detection module 52L uses a brushless motor. An electrical signal outputted by the left motor actual rotational speed detection module 52L is a counter-electromotive force varying periodically. A current and/or a voltage of the left running motor 143L are detected so that a zero-crossing of the counter-electromotive force is determined, thereby obtaining the periodic variation of the left motor actual rotational speed detection module 52L and the actual rotational speed of the left motor actual rotational speed detection module 52L. In this manner, there is no need to set a sensor to detect the actual rotational speed of the left motor actual rotational speed detection module 52L so that the cost is reduced. In addition, the detection accuracy is not affected by a high rotational speed and temperature, and the entire machine structure is simpler.

The left motor current detection module 54L is associated with the left running motor 143L and configured to acquire a current of the left running motor 143L, where the current may be a bus current of the motor or a phase current of the left running motor 143L. The left motor current detection module 54L transmits the acquired current of the left running motor 143L to the left motor control module 50L.

The left motor driver circuit 53L is connected to the left motor control module 50L and the left running motor 143L and configured to control the operation of the left running motor 143L according to the signal outputted by the left motor control module 50L.

Optionally, the left running motor 143L may be connected to the left driving wheel 141L through a deceleration device 55L, and an output rotational speed of the left running motor 143L is reduced by the deceleration device 55L and then outputted to the left driving wheel 141L, so as to drive the left driving wheel 141L to rotate. In this manner, the torque of the left running motor 143L is transmitted to the left driving wheel 141L through the deceleration device to drive the left driving wheel 141L. In other examples, the left running motor 143L and the left driving wheel 141L are directly connected.

The right motor control system mainly includes a right motor control module 50R, a right motor target rotational speed detection module 51R, a right motor actual rotational speed detection module 52R, a right motor driver circuit 53R, a right motor current detection module 54R, and the right running motor 143R. The function and composition of the right motor control system are the same as or similar to the function and composition of the left motor control system, which is not repeated herein.

In the preceding example, the left motor actual rotational speed detection module 52L and the right motor actual rotational speed detection module 52R may be two separately provided modules, which are associated with the left running motor 143L and the right running motor 143R, respectively and configured to generate the actual rotational speed of the left running motor 143L and the actual rotational speed of the right running motor 143R, respectively. The left motor actual rotational speed detection module 52L and the right motor actual rotational speed detection module 52R may also be the integration of the preceding two modules.

In the preceding example, the left motor target rotational speed detection module 51L and the right motor target rotational speed detection module 51R respectively associated with the left operating lever 151L and right operating lever 151R the may be two separate modules or an integrated module.

In the preceding example, the left motor control module 50L and the left motor target rotational speed detection module 51L are connected through a bus 56, the target rotational speed of the left running motor 143L that is set by the left operating device 15L and detected by the left motor target rotational speed detection module 51L can be sent to the left motor control module 50L through the bus 56, and the left motor control module 50L receives a detection result from the left motor target rotational speed detection module 51L through the bus 56. Optionally, a communication frame rate of the bus has a range of 100 Hz to 2000 Hz. Optionally, the communication frame rate of the bus has a range of 200 Hz to 2000 Hz. Optionally, the communication frame rate of the bus has a range of 300 Hz to 3000 Hz.

In some examples, the communication frame rate of the bus has a range of 100 Hz to 1000 Hz. In some examples, the communication frame rate of the bus has a range of 200 Hz to 800 Hz. In some examples, the communication frame rate of the bus has a range of 100 Hz to 500 Hz. In some examples, the communication frame rate of the bus has a range of 500 Hz to 1000 Hz. In some examples, the communication frame rate of the bus has a range of 500 Hz to 1500 Hz. In some examples, the communication frame rate of the bus has a range of 1000 Hz to 2000 Hz. In some examples, the communication frame rate of the bus has a range of 1000 Hz to 1500 Hz. The communication frame rate of the bus refers to the number of times the bus receives and/or sends data packets in one second.

In this manner, a data transmission rate between the left motor control module 50L and the left motor target rotational speed detection module 51L can be increased so that a response speed of the first motor 143 can be improved.

Similarly, the right motor control module 50R and the right motor target rotational speed detection module 51R are also connected through the bus 56, which is not repeated herein. The right motor control module 50R and the right motor target rotational speed detection module 51R may also be connected through other buses.

Figure 17:
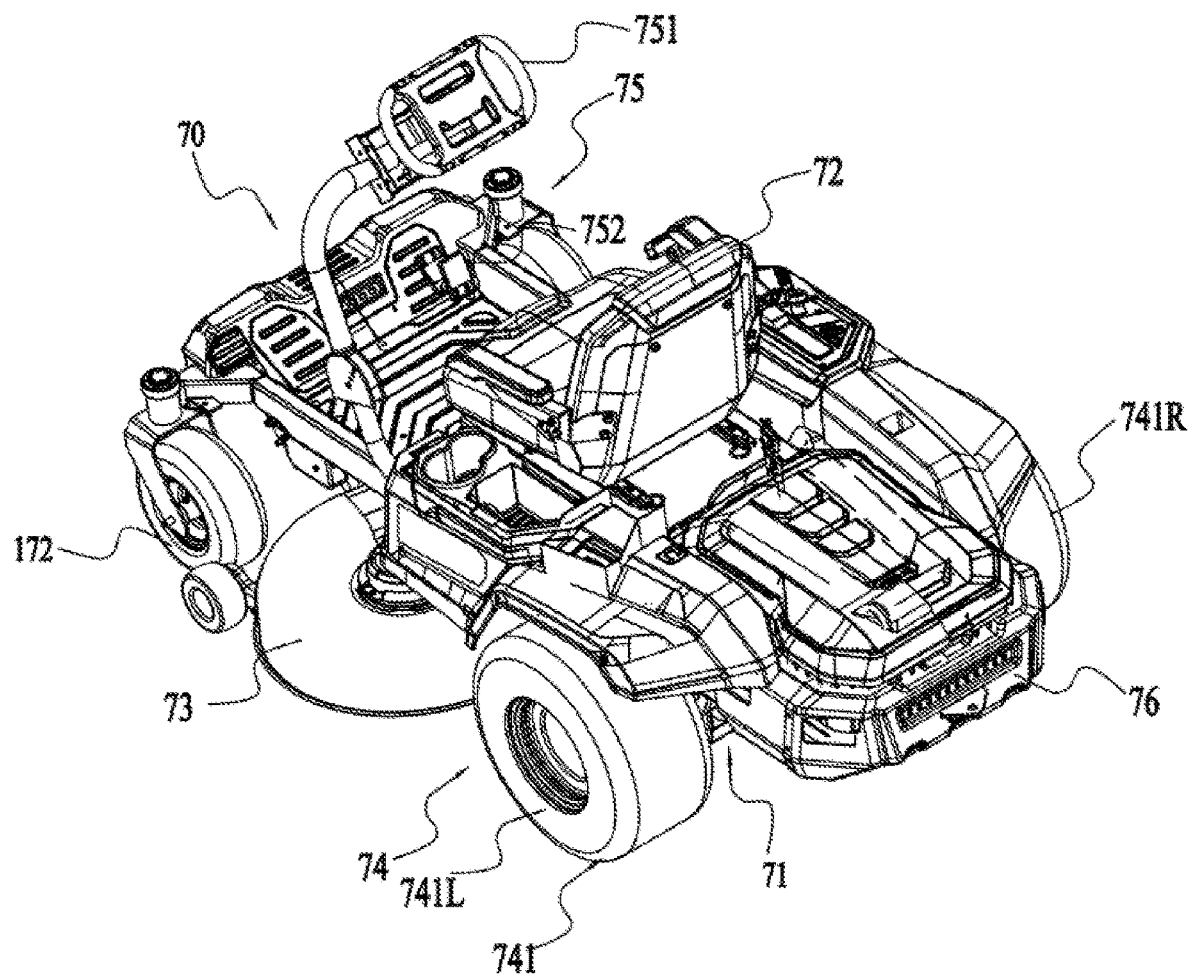
FIG. 17 is an external view of a riding lawn mower as another example.

Optionally, each of the left motor target rotational speed detection module 51L and the right motor target rotational speed detection module 51R includes an angle sensor or a position sensor configured to detect the angle of rotation or the position after rotation of the operating lever 151 of the operating device 15. In other examples, the operating device 15 of the riding lawn mower 10 includes a steering wheel 751 and a speed lever 752 (a throttle) (FIG. 17) at least configured to set a target rotational speed of the first motor 141. The target rotational speed of the first motor 141 is comprehensively determined by the steering wheel 751 and the speed lever 752. The speed lever gives a target speed, and an angle of rotation of the steering wheel 751 is used for distributing speeds to the left motor and the right motor. The operator may turn the steering wheel 751 and step on the speed lever 752 so that the riding lawn mower 10 is controlled by the angle of rotation of the steering wheel 751 and a position of the speed lever 752 and thus the target rotational speed of the first motor 141 is set. The operator may steer the riding lawn mower 10 by turning the steering wheel, such as turning or going straight, and the speed lever 752 is configured to determine the target speed of the motor. Optionally, the steering wheel 751 is an electronic steering wheel.

Optionally, each of the left motor target rotational speed detection module 51L and the right motor target rotational speed detection module 51R includes a sensor. Optionally, a data refresh rate of the sensor has a range of 50 µs/time to 10 ms/time. In some examples, the data refresh rate of the sensor has a range of 50 µs/time to 200 µs/time. In some examples, the data refresh rate of the sensor has a range of 100 µs/time to 300 µs/time. In some examples, the data refresh rate of the sensor has a range of 200 µs/time to 500 µs/time. In some examples, the data refresh rate of the sensor has a range of 100 µs/time to 1 ms/time. In some examples, the data refresh rate of the sensor has a range of 500 µs/time to 1 ms/time. In some examples, the data refresh rate of the sensor has a range of 1 ms/time to 10 ms/time.

Referring to FIGS. 2 to 4, in an example, each of the left motor target rotational speed detection module 51L and the right motor target rotational speed detection module 51R includes a position detection module (that is, a first detection device), where the position detection module includes a magnetic element 171 and a magnetic sensor 172. In this example, the magnetic sensor is a Hall sensor. In other examples, the magnetic sensor is a magnetoresistive sensor.

The magnetic element 171 or the magnetic sensor 172 is associated with the operating lever 151 or the pivoting combination, and the magnetic sensor 172 and the magnetic element 171 are spaced apart so that when the operating lever 151 rotates around the first axis A in the first direction F1, the operating lever 151 can drive the magnetic element 171 and the magnetic sensor 172 to rotate relative to each other, so as to detect the forward position, the mid-gear position, and the backward position of the operating lever 151 in the first direction F1.

Optionally, when the operating lever 151 rotates around the second axis B in the second direction F2, the operating lever 151 can drive the magnetic element 171 and the magnetoresistive sensor 172 to move relative to each other, so as to detect the inner position and the outer position of the operating lever 151 in the second direction F2.

The magnetic element 171 is associated with the operating lever 151 and can move along with the operating lever 151, the magnetic sensor 172 is fixedly installed on the bracket 152, and the magnetic element 171 is disposed corresponding to the magnetic sensor 172 so that when the operating lever 151 rotates around the first axis A in the first direction F1, the magnetic element 171 and the magnetic sensor 172 can move relative to each other, and the magnetic sensor 172 outputs a first detection signal related to the position of the operating lever 151 in the first direction.

Optionally, when the operating lever 151 rotates around the second axis B in the second direction F2, the magnetic element 171 and the magnetic sensor 172 can move relative to each other, and the magnetic sensor 172 can output a second detection signal related to the position of the operating lever 151 in the second direction F2.

The magnetic element 171 is installed on the operating lever 151. Exemplarily, the operating lever 151 is provided with a first installation portion 1511, where the first installation portion 1511 is integrally formed with or fixedly installed to the operating lever 151, and the installation portion 1511 is used for installing the magnetic element 171 so that the magnetic element 171 is fixed to the operating lever 151 and thus can move synchronously with the operating lever 151.

The magnetic sensor 172 is fixedly installed on the bracket 152. Optionally, the bracket 152 is provided with a second installation portion 1521, where the second installation portion 1521 is integrally formed with or fixedly installed to the operating lever 151, and the second installation portion 1521 is used for installing the magnetic sensor 172. The second installation portion is further used for installing a printed circuit board (PCB) 18, and the magnetic sensor 172 is disposed on the PCB 18. To enable the magnetic sensor 172 to be firmly fixed on the PCB 18, the magnetic sensor 172 is sealed on the PCB with glue.

A position of the first installation portion 1511 and a position of the second installation portion 1521 are set correspondingly so that the magnetic sensor 172 can output detection signals that satisfy the requirements, where the detection signals are related to the position of the operating lever 151 in the first direction and the position of the operating lever 151 in the second direction F2.

The position detection module is at least partially associated with the bracket 152 and/or the pivoting combination or the operating lever 151 and configured to detect the position of the operating lever 151 in the first direction F1, including the forward position, the mid-gear position, and the backward position. For example, when the operating lever 151 is at the forward position, the corresponding target state of the first motor 143 is a maximum forward speed; when the operating lever 151 is at the backward position, the corresponding target state of the first motor 143 is a maximum reverse speed; when the operating lever 151 is at the mid-gear position, the corresponding target state of the first motor 143 is the zero speed. By moving the operating lever 151, the operator sets the corresponding target rotational speed of the first motor 141 and controls the corresponding action of the first motor 141 so that the corresponding target rotational speed of the first motor 141 is also the target rotational speed or the target state set by the operator and obtained according to the position of the operating lever 151.

Optionally, the position detection module can also detect the position of the operating lever 151 in the second direction F2, including the inner position and the outer position. When the operating lever 151 is at the inner position, the corresponding state of the riding lawn mower 10 is the operation state (that is, the ready state). In some examples, the inner position coincides with or is close to the mid-gear position, and the corresponding target state of the first motor 143 is the zero speed state; when the operating lever 151 is at the outer position, the corresponding state of the riding lawn mower 10 is the non-operation state.

In this example, the magnetic element 171 is associated with the magnetic sensor 172 so that when the operating lever 151 rotates around the first axis A in the first direction F1, the operating lever 151 can drive the magnetic element 171 and the magnetic sensor 172 to rotate relative to each other, and the magnetic sensor 172 outputs detection signals related to the forward position, the mid-gear position, and the backward position of the operating lever 152 in the first direction F1. The detection signals contain position information of the operating lever 151. In this manner, the position of the operating lever 152 in the first direction F1 is detected, including the forward position, the mid-gear position, and the backward position. Different positions of the operating lever 152 in the first direction F1 correspond to different target speeds and rotational directions of the first motor 143 so that the target rotational speed of the first motor 143 can be obtained by detecting the position of the operating lever 152.

Positions where the magnetic element 171 and the magnetic sensor 172 of the position detection module are installed are not limited to the preceding manner, as long as the magnetic element 171 of the position detection module is spaced apart from and associated with the magnetic sensor 172 of the position detection module 17 so that the magnetic element 171 and the magnetic sensor 172 are associated with the position of the operating lever 151 in the first direction and the position of the operating lever 151 in the second direction, and thus the magnetic element 171 and the magnetic sensor 172 can move relative to each other when the operating lever 151 rotates, all of which fall within the protection scope of the present application.

In this example, two magnetic sensors 172, that is, a first magnetic sensor 172a and a second magnetic sensor 172b, are provided at different positions of a substrate or the PCB. As an example, the first magnetic sensor 172a and the second magnetic sensor 172b may be symmetrically arranged relative to a centerline of the magnetic element. In some other examples of the present application, multiple Hall sensors may be provided at different positions of the substrate or the PCB to detect the position of the operating lever 151 in the first direction F1.

Optionally, the principle of detecting the position of the operating lever 151 in the first direction F by the magnetic sensors 172 and the magnetic element 171 is described below.

Referring to FIGS. 3 and 4, when the operating lever 151 rotates in the first direction F1, the operating lever 151 drives the magnetic element 171 to rotate, and the magnetic sensors 172 and the magnetic element 171 rotate relative to each other by an angle. Since voltages of the magnetic sensors 172 have a linear relationship with a magnetic field intensity, a relative positional relationship between the magnetic sensors 172 and the magnetic element 171 can be determined according to output voltages of the two magnetic sensors 172 so that a relationship between the output voltages of the magnetic sensors 172 and the position of the operating lever 151 can be calibrated, a calibration result may be stored in control modules (30, 50, 60), and thus the control modules (30, 50, 60) can determine the corresponding position of the operating lever 151 according to the output voltages of the magnetic sensors 172.

Referring to FIG. 3, assuming that FIG. 3 illustrates that the backward position of the operating lever 151 in the first direction F1 is a maximum backward position and the forward position of the operating lever 151 in the first direction F1 is a maximum forward position, when the operating lever 151 rotates from the backward position to the forward position, the output voltages of the two magnetic sensors 172 vary with the movement position of the operating lever 151. The relationship between the output voltages of the two magnetic sensors 172 and the position of the operating lever 151 is calibrated so that a current position of the operating lever 151 can be determined according to the output voltages of the two magnetic sensors 172.

In this example, due to the preceding structure, the sensors are fixed, and the magnetic element is associated with the operating lever. The positions of the operating lever in two directions are detected by using the relative positional relationship between the magnetic element and the sensors so that the problem of an inaccurate detection result due to the movement of the sensors and damage to the sensors, connection lines, and the circuit due to frequent movement and pulling of the connection lines of the sensors can be solved, the detection result is more reliable, the reliability of the system is higher, and the structure is simpler.

Figure 6:
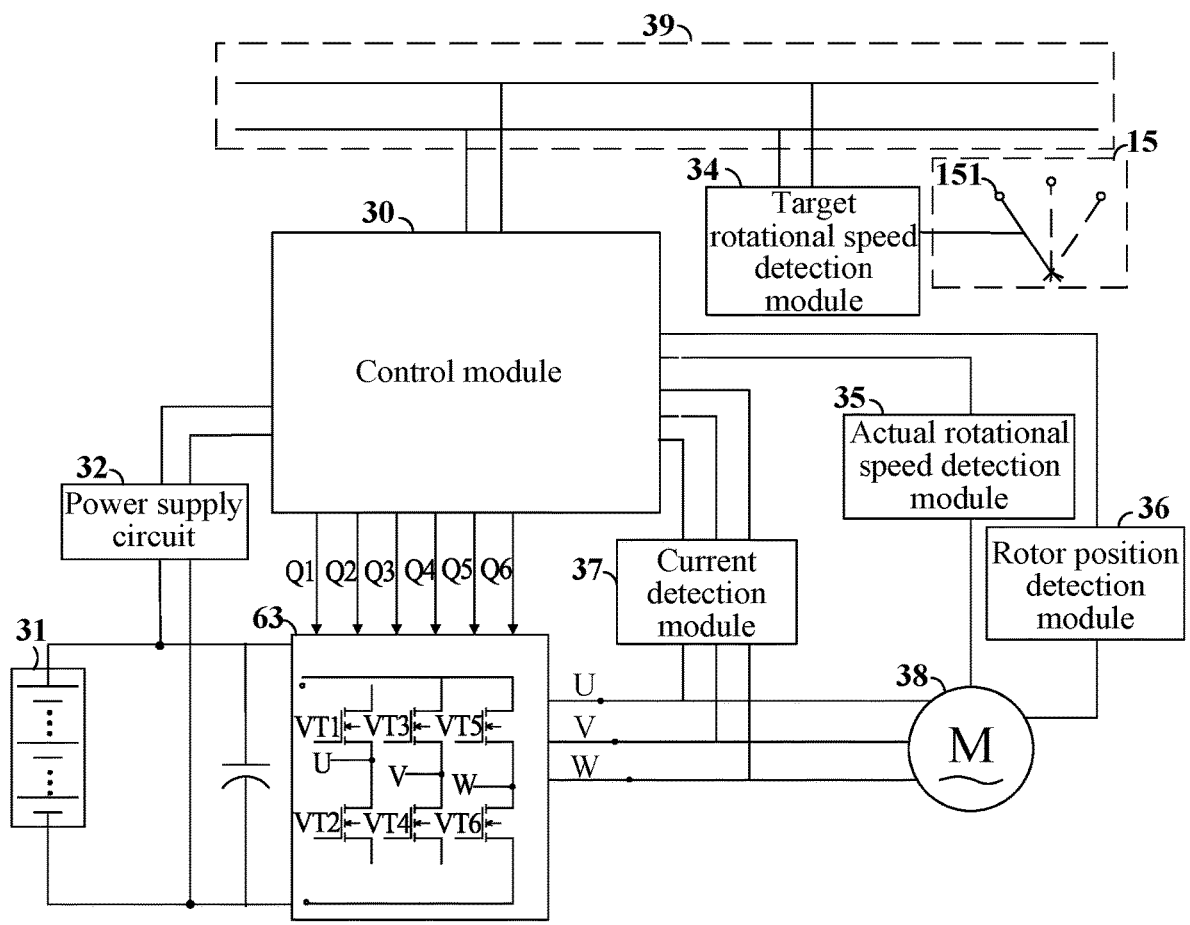
FIG. 6 is a block diagram of a control system of a first motor of one of a left motor or a right motor according to an example.

Referring to FIG. 6, as an example, a control system of the first motor 143 is applicable to any one of the preceding left motor control system or the preceding right motor control system. In this example, the first motor 143 is a motor 38, where the motor 38 may be a brushless motor. The motor 38 has a stator, a rotor, and stator windings.

In this example, the control system of the first motor 143 includes a control module 30, a power supply 31, a power supply circuit 32, a driver circuit 33, a target rotational speed detection module 34, an actual rotational speed detection module 35, a rotor position detection module 36, a current detection module 37, a running motor 38, a bus 39, and the operating device 15 as described above.

The control module 30 is configured to control an operation process of the motor 38. In some examples, the control module 30 is a dedicated controller such as some dedicated control chips (such as a microcontroller unit (MCU)). The control module 30 is integrated with a signal processing unit, where the signal processing unit is configured to process acquired related parameter signals and has functions of calculation, comparison, and determination. After the signal processing unit processes the signals, the signal processing unit can generate control signals and output the control signals to the driver circuit 33, so as to drive the motor 38 to operate.

The power supply 31 is configured to supply electric power to a control system of the motor 38. In this example, the electric power of the power supply 31 comes from the preceding power supply device 16. The power supply circuit 32 is connected to the power supply 31, and the power supply 31 is configured to receive the electric power from the power supply 31 and convert the electric power of the power supply 31 into electric power for at least the control module 30.

The driver circuit 33 is electrically connected to the control module 30 and the motor 38, and the driver circuit 33 can drive the motor 38 to operate according to a control signal outputted by the control module 30. As an example, the motor 38 is a three-phase motor with three-phase windings, and the driver circuit 33 is electrically connected to the three-phase windings of the motor 38. The driver circuit 33 includes a switching circuit, where the switching circuit is configured to drive the running of the rotor of the motor 38 according to the control signal of the control module 30.

To make the motor 38 rotate, the driver circuit 33 has multiple driving states. In a driving state, stator windings of the motor generate a magnetic field, and the control module 30 is configured to output a corresponding drive signal to the driver circuit 33 according to a position after rotation of the rotor of the motor 38 to make the driver circuit 33 switch the driving state. In this manner, a state of a voltage and/or a current applied to the windings of the motor 38 varies, and an alternating magnetic field is generated to drive the rotor to rotate so that the motor can be driven to operate.

A rotor position of the motor 38 can be obtained by the rotor position detection module 36. For example, the rotor position detection module 36 includes three Hall sensors disposed along a circumferential direction of the rotor of the motor 38. When the rotor rotates in and out of a preset range, signals of the Hall sensors vary, and an output signal of the rotor position detection module 36 also varies accordingly. In this manner, the position of the rotor of the motor can be known according to a detection signal outputted by the rotor position detection module 36.

Figure 7:
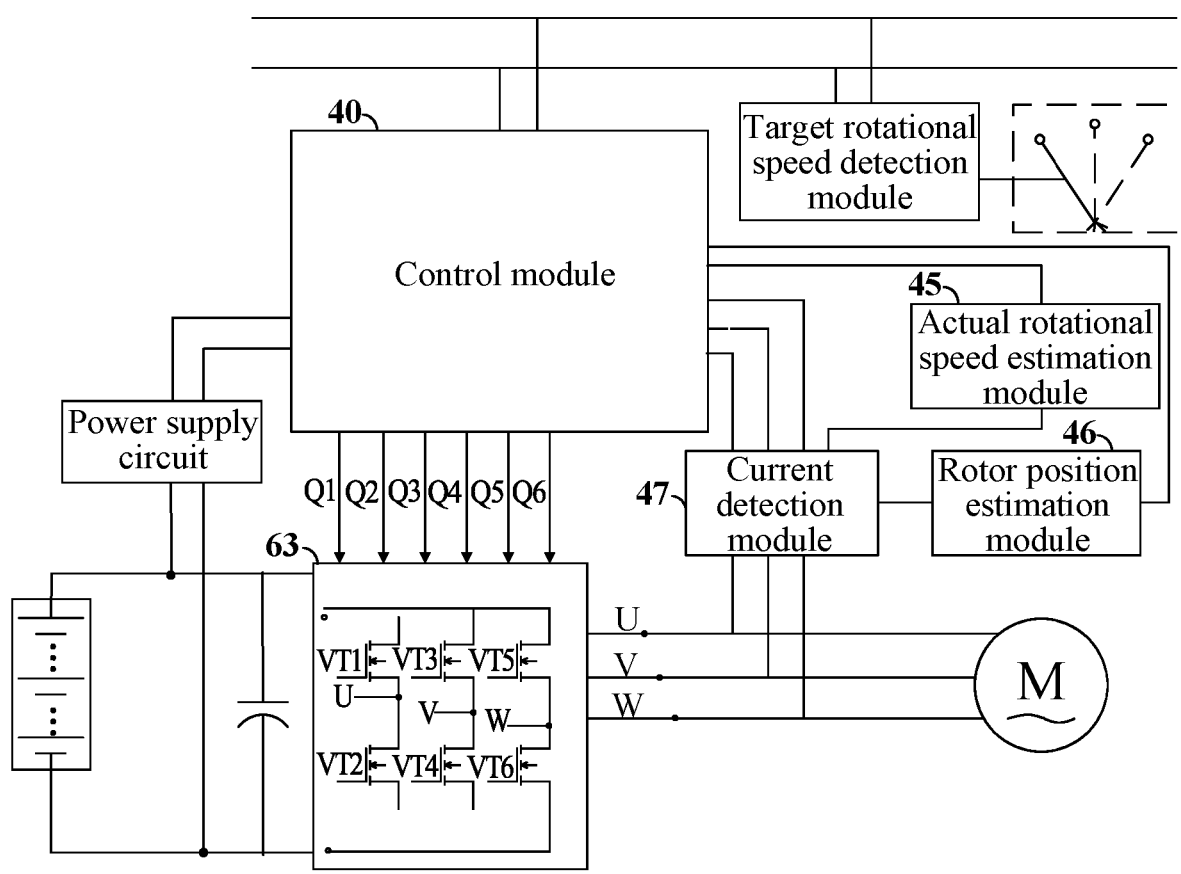
FIG. 7 is a block diagram of a control system of a first motor of one of a left motor or a right motor according to another example.

The rotor position may also be estimated according to a motor current. Referring to FIG. 7, a rotor position estimation module 46 is configured to estimate a motor current obtained by a current detection module 47. The rotor position estimation module 46 may be built in a control module 40 or may be externally disposed on the control module 40.

The driver circuit 33 shown in FIG. 6 includes switch elements VT1, VT2, VT3, VT4, VT5, and VT6. The switch elements VT1, VT2, VT3, VT4, VT5, and VT6 form a three-phase bridge, where VT1, VT3, and VT5 are upper bridge switches, and VT2, VT4, and VT6 are lower bridge switches. Field effect transistors, insulated-gate bipolar transistors (IGBTs) and the like may be selected as the switch elements VT1 to VT6. Control ends of the multiple switch elements are electrically connected to the control module 30 respectively. The switch elements VT1 to VT6 change a connection state according to the drive signal outputted by the control module 30, so as to change the state of the voltage and/or the current applied to the windings of the motor 38 by the power supply 31, thereby driving the motor 38 to operate.

The target rotational speed detection module 34 is associated with the operating device 15. In this example, the target rotational speed detection module 34 is associated with the operating lever 151 of the operating device 15, and the target rotational speed detection module 34 can obtain the corresponding rotational speed of the first motor 143 set by the user through the operating lever 151. In this example, the target rotational speed detection module 34 may adopt the position detection module shown in FIGS. 2 and 4.

The actual rotational speed detection module 35 is associated with the motor 38 and configured to detect an actual rotational speed of the motor 38. In an example, the actual rotational speed detection module 35 includes a speed detection sensor disposed near or inside the motor 38 to acquire the actual rotational speed of the motor 38. For example, a photoelectric sensor disposed near the motor 38 can acquire the rotational speed of the motor 38. For another example, a Hall sensor disposed near the rotor inside the motor 38 can acquire the actual rotational speed of the motor 38 according to the angle of rotation of the rotor.

However, in some cases where the first motor 143 operates at a high speed and/or high temperature, or the first running wheel 141 operates at a high speed and/or high temperature, or the riding lawn mower operates at high temperature, the detection accuracy of the sensor will be affected, and the speed detection sensor even fails to perform detecting. To solve this problem, as another example, the actual rotational speed detection module 35 does not include a sensor, and an electrical signal outputted by the motor 38 is estimated. For example, the current of the motor 38 is detected so that a zero-crossing of a counter-electromotive force of the motor 38 is obtained, a periodic variation law of the operation of the motor 38 is obtained, and thus the actual rotational speed of the motor 38 is obtained according to the periodic variation law. Referring to FIG. 7, an actual rotational speed estimation module 45 is connected to the current detection module 47 and configured to obtain the actual rotational speed of the motor 38 according to the motor current outputted by the current detection module 47. In this manner, there is no need to set a sensor to detect the actual rotational speed of the motor 38 so that the cost is reduced. In addition, the detection accuracy is not affected by a high rotational speed and temperature, and the entire machine structure is simpler. The motor 38 may be an inner rotor motor or an outer rotor motor. In some examples, the motor 38 is an inner rotor brushless motor. Optionally, the motor 38 is an inner rotor permanent magnet synchronous brushless motor. In some examples, the motor 38 is an outer rotor brushless motor. Optionally, the motor 38 is an outer rotor permanent magnet synchronous brushless motor.

The actual rotational speed detection module 35 and the rotor position detection module 36 shown in FIG. 6 may be integrated together or may be set separately. The actual rotational speed estimation module 45 and the rotor position estimation module 46 shown in FIG. 7 may be integrated together or may be set separately.

The current detection module 37 is associated with the motor 38 and configured to acquire an operation current of the motor 38, where the current may be a bus current of the motor 38 or a phase current of the motor 38. The current detection module 37 transmits the acquired current of the motor 38 to the control module 30.

The control module 30 is connected to the target rotational speed detection module 34, the actual rotational speed detection module 35, the current detection module 37, and the rotor position detection module 36 of the motor and configured to adjust a control quantity of the motor 38 according to the target rotational speed of the motor 38 and the actual rotational speed of the motor 38 set by the user through the operating device 15 and detected by the target rotational speed detection module 34 and output a control signal to control the motor 38 to make the actual rotational speed of the motor 38 reach or basically reach the target rotational speed within a preset time, thereby improving the user experience. In addition, the following case can be avoided: due to the hysteresis of the response of the motor 38, the riding lawn mower may slip backward during a climbing process, which is dangerous.

In this example, the control module 30 is configured to output the control signal to the driver circuit 33 so that an input current or an input voltage of the first motor 143 varies with the rotor position of the first motor 143, and thus actual torque or an actual rotational speed of the first motor 143 reaches or basically reaches the target torque or the target rotational speed within a preset time, where the preset time is less than 100 ms. In some examples, the preset time is less than 80 ms. In some examples, the preset time is less than 50 ms. In some examples, the preset time is less than 20 ms. In the case where a difference between the actual torque and the target torque of the first motor 143 is less than 10% of the target torque, it is considered that the target torque is basically reached.

In some examples, the first detection device is configured to detect an actual measured rotational speed of the driving wheel in real time and send the actual measured rotational speed at a first preset time interval. The control module is configured to receive the actual measured rotational speed sent by the first detection device and the target rotational speed set by an operating assembly.

The control module is configured to, based on the actual measured rotational speed of the driving wheel sent by the first detection device at the first preset time interval, one of the target rotational speed or the target torque set by the operating assembly, and a rotor position of the driver motor, perform dynamic adjustment on currents applied to multi-phase windings to make the driver motor reach or basically reach the target torque set by the operating assembly within a preset time, where a duration of a second preset time is less than a duration of a first preset time.

Figure 15:
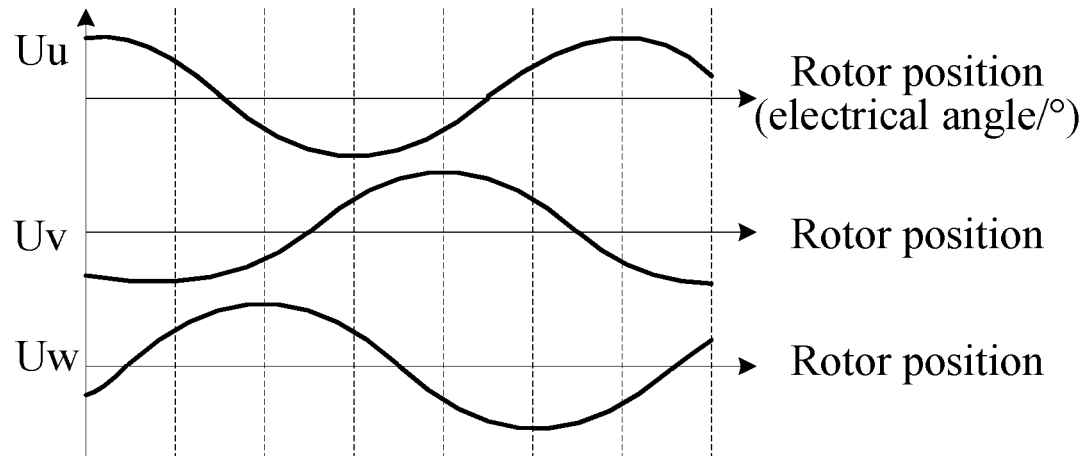
FIG. 15 illustrates sine wave variations of three-phase voltages of a motor with a rotor position.
Figure 16:
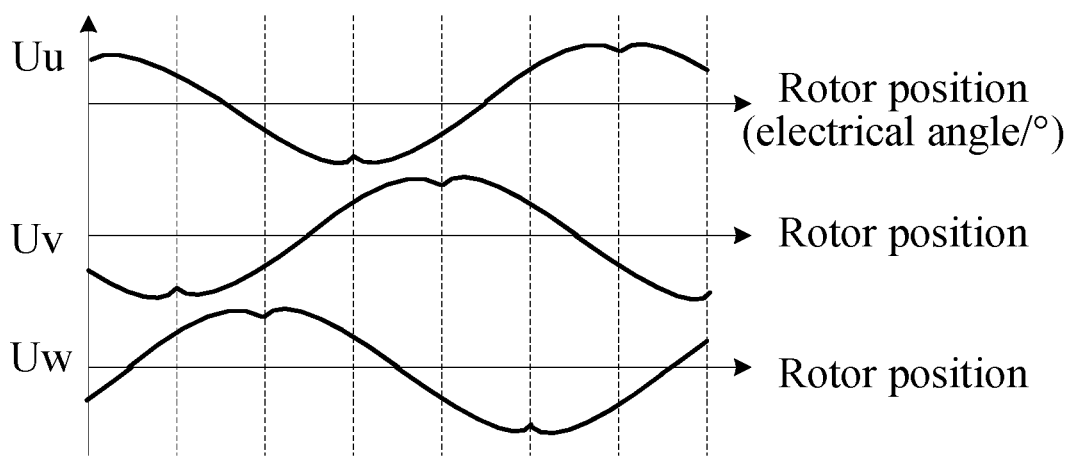
FIG. 16 illustrates saddle wave variations of three-phase voltages of a motor with a rotor position.

In this example, the input voltage of the first motor 143 varies in a sine wave or a saddle wave, and the input current of the first motor varies in a sine wave. Optionally, the motor 38 is a three-phase motor, and input currents or input voltages of the motor 38 vary in three-phase symmetrical sine waves. As shown in FIG. 15, three-phase voltages Uu, Uv, and Uw applied to the motor 38 vary in sine waves, or the input voltages of the motor 38 vary in three-phase symmetrical saddle waves. As shown in FIG. 16, the three-phase voltages Uu, Uv, and Uw applied to the motor 38 vary in three-phase symmetrical saddle waves. In this example, a phase angle between any two of the three-phase voltages Uu, Uv, and Uw is 120°. The input currents of the motor 38 vary in sine waves corresponding to the input voltages of the motor 38.

The control module 30 and the target rotational speed detection module 34 are connected through a bus 39. The target rotational speed detection module 34 sends data to the control module 30 through the bus 39, and the control module 30 receives the data through the bus 39. A communication frame rate of the bus has a range of 10 Hz to 600 Hz. In this manner, the data transmission rate between the left motor control module 50L and the left motor target rotational speed detection module 51L can be increased so that a response speed of the motor 58 can be improved. The target rotational speed detection module 34 includes a sensor, and a data refresh rate of the sensor has a range of 50 μs/time to 10 ms/time so that the response speed of the motor 58 can be improved.

In some examples, the data refresh rate of the sensor has a range of 50 μs/time to 200 μs/time. In some examples, the data refresh rate of the sensor has a range of 100 μs/time to 300 μs/time. In some examples, the data refresh rate of the sensor has a range of 200 μs/time to 500 μs/time. In some examples, the data refresh rate of the sensor has a range of 100 μs/time to 1 ms/time. In some examples, the data refresh rate of the sensor has a range of 500 μs/time to 1 ms/time. In some examples, the data refresh rate of the sensor has a range of 1 ms/time to 10 ms/time.

Figure 8:
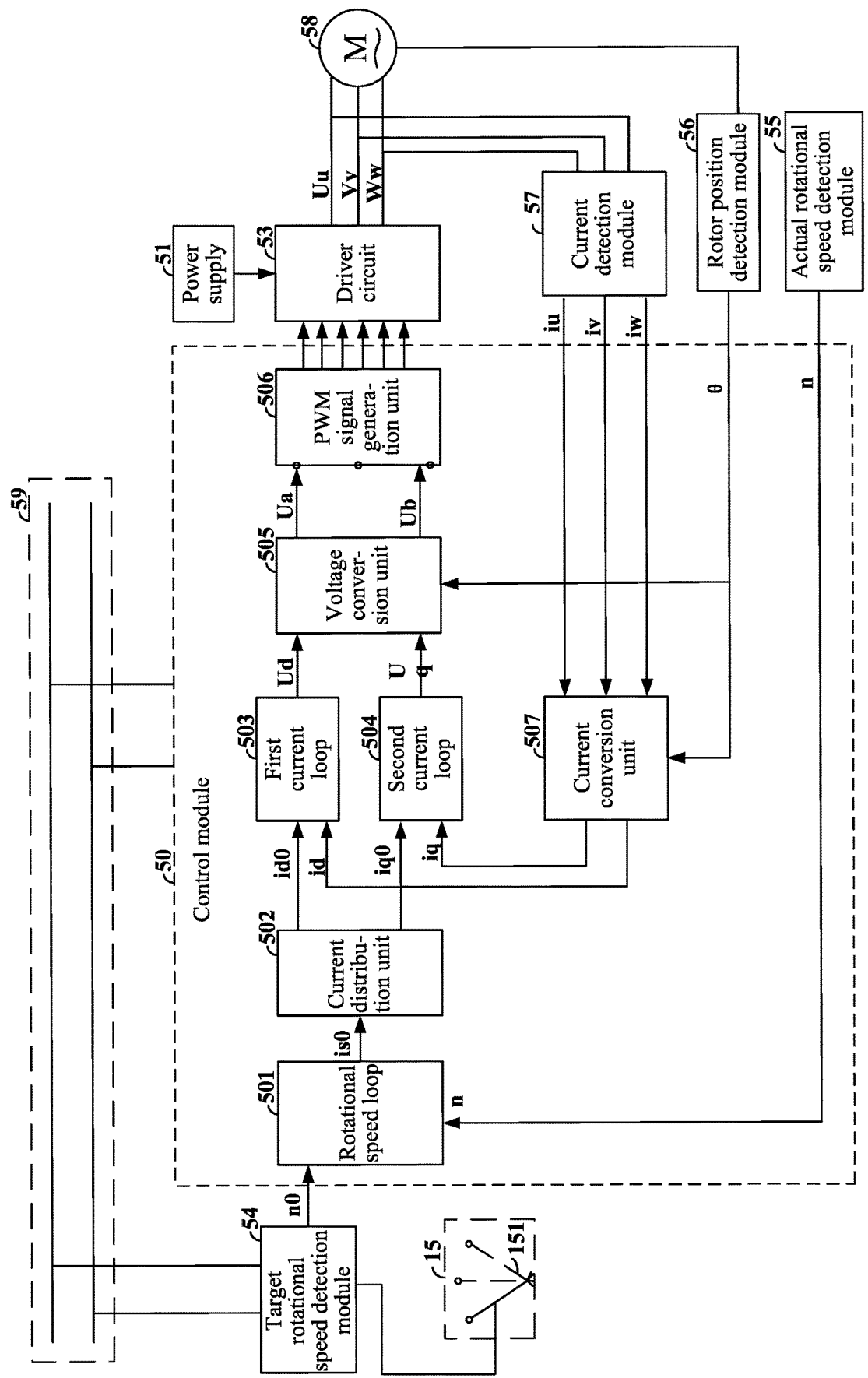
FIG. 8 is a block diagram of a control system of a first motor as an example.

Referring to FIG. 8, as an example of the control system of the first motor 143, the control system includes a control module 50, a power supply 51, a driver circuit 53, a target rotational speed detection module 54, an actual rotational speed detection module 55, a rotor position detection module 56, a current detection module 57, a motor 58, and a bus 59. The functions, structures, and compositions of the multiple assemblies in this example are the same as or similar to the functions, structures, and compositions of the multiple assemblies in the preceding example shown in FIG. 6, which is not repeated herein. The difference is that the control module 50 in this example mainly includes a first rotational speed loop 501, a current distribution unit 502, a first current loop 503, a second current loop 504, a voltage conversion unit 505, a current conversion unit 507, and a pulse-width modulation (PWM) signal generation unit 506.

The first rotational speed loop 501 is associated with the target rotational speed detection module 54 and the actual rotational speed detection module 55. The first rotational speed loop 501 is configured to acquire a target rotational speed n0 of the motor 58 set by the user through the operating device 15 and detected by the target rotational speed detection module 54 and an actual rotational speed n of the motor 58 detected by the actual rotational speed detection module 55. The target rotational speed detection module 54 is associated with the operating device. In this example, the target rotational speed detection module 54 is associated with the operating lever 151 and configured to detect the position or the angle of rotation of the operating lever 151. The target rotational speed detection module 54 may adopt the position detection module shown in FIGS. 2 and 4.

The first rotational speed loop 501 is configured to generate a target current is0 according to the target rotational speed n0 and the actual rotational speed n of the motor 58. Optionally, the first rotational speed loop 501 can generate the target current is0 through comparison and adjustment according to the target rotational speed n0 and the actual rotational speed n of the motor 58, and the target current is0 is used for making the actual rotational speed n of the motor 58 approach the target rotational speed n0. The first rotational speed loop includes a comparison unit and an adjustment unit, where the adjustment unit may be a proportional-integral (PI) adjustment unit.

The current distribution unit 502 is connected to the first rotational speed loop 501 and configured to distribute a direct axis target current id0 and a quadrature axis target current iq0 according to the target current is0.

Figure 9:
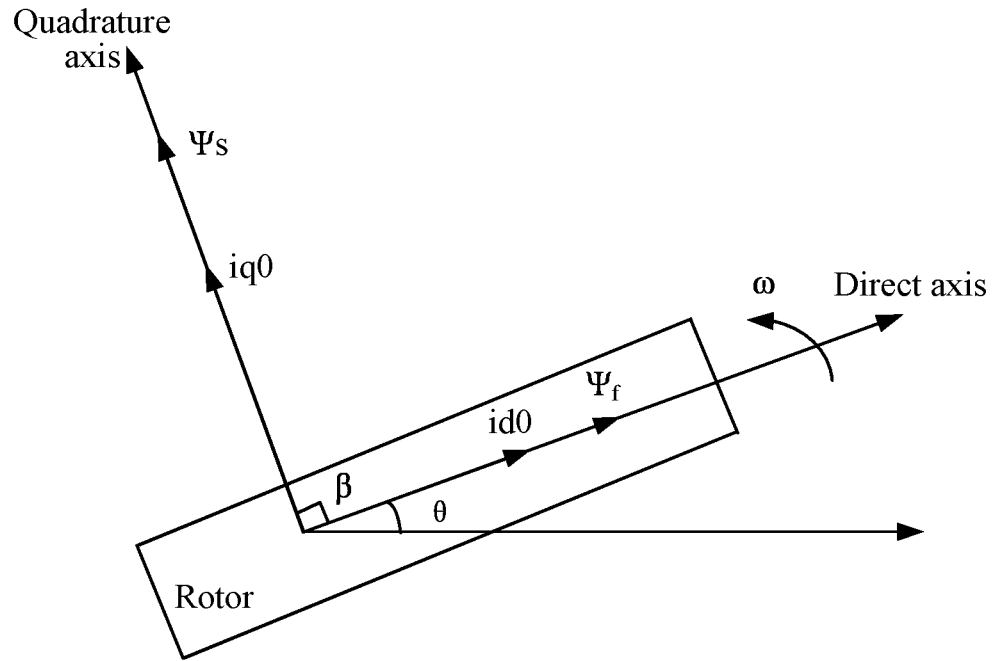
FIG. 9 is a space vector diagram of a motor in an example.

Referring to FIG. 9, the direct axis and the quadrature axis constitute a direct axis-quadrature axis coordinate system. The direct axis-quadrature axis coordinate system is established on the rotor of the motor and rotates synchronously with the rotor. A magnetic field direction of the rotor is the direct axis, the quadrature axis is perpendicular to the magnetic field direction of the rotor, the direct axis target current id0 is in the same direction as the direct axis, and the quadrature axis target current iq0 is in the same direction as the quadrature axis. The quadrature axis target current iq0 is an excitation current and used for controlling torque and generating torque perpendicular to the rotor to drive the rotor to rotate. The quadrature axis target current iq0 is used for controlling the speed of the motor to reach the target rotational speed n0 of the motor 58 as quickly and stably as possible. The principle is to use a torque current to control electromagnetic torque of the motor so that the motor can drive the rotor to rotate to the maximum. The quadrature axis target current iq0 and the direct axis target current id0 may be obtained by calculation or may be set directly.

In the case where a voltage is applied to the motor, the stator can generate a current so that the motor 58 generates electromagnetic torque Te. The electromagnetic torque Te of the motor may be obtained by the formula described below.

$$Te = 1.5Pn[\Psi_f * iq0 + (Ld - Lq) * id * iq] \quad (1)$$

$\Psi_f$ denotes a rotor flux linkage, iq denotes a quadrature axis current, id denotes a direct axis current, Ld denotes direct axis inductance, Lq denotes quadrature axis inductance, and Pn denotes the number of magnetic pole pairs.

As an example of the motor, Ld=Lq. Referring to FIG. 9, in this case, Te0=1.5Pn*$\Psi_f$*iq0. To obtain a relatively large electromagnetic torque Te, the current distribution unit 502 makes the quadrature axis target current iq0 as large as possible. Since the quadrature axis target current iq0 and the direct axis target current id0 are actually obtained by decoupling the target current is0 of the motor, if the quadrature axis target current iq0 is to be as large as possible, the direct axis target current id0 should be as small as possible. As an example, id0=0 so that an included angle β between a stator flux linkage Ψs and the rotor flux linkage $\Psi_f$ is 90° (shown in FIG. 9). In this manner, the torque is controlled by controlling the quadrature axis target current iq0, and the torque is perpendicular to the rotor to drive the rotor to rotate. The stator flux linkage Ψs refers to a flux linkage formed by interlinking the magnetic flux generated by a stator current and the stator windings. The rotor flux linkage refers to a flux linkage formed by interlinking the magnetic flux generated by a rotor permanent magnet and the stator windings.

Figure 10:
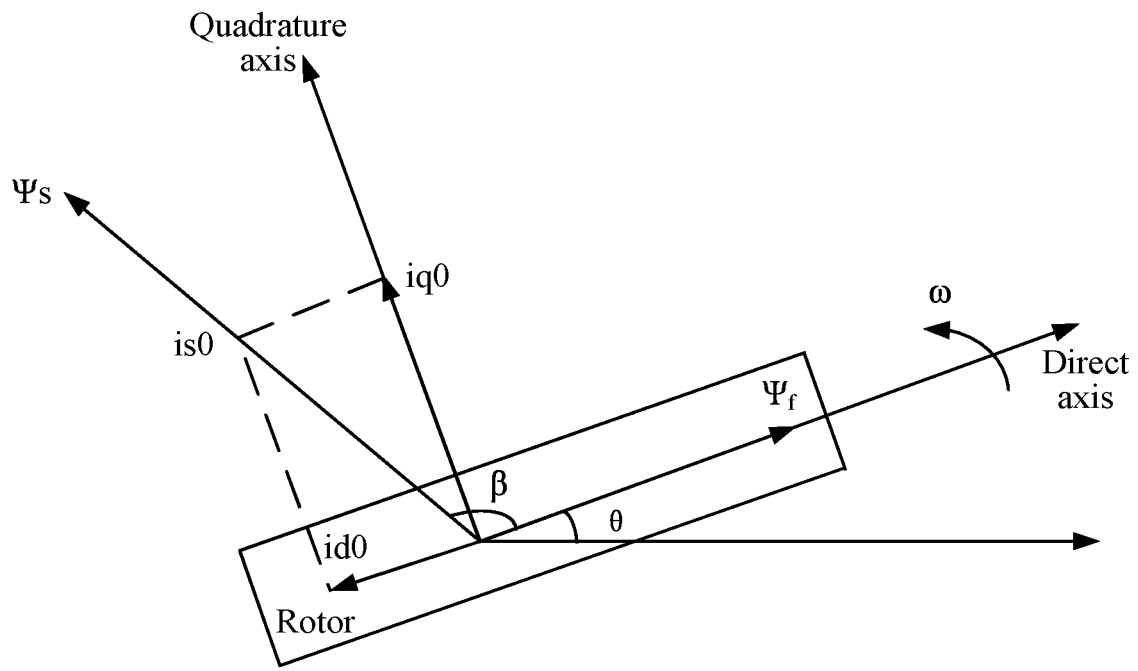
FIG. 10 is a space vector diagram of a motor in another example.

As another example of the motor, Ld<Lq. Referring to FIG. 10, to obtain the electromagnetic torque Te as large as possible, id0<0, where the direct axis target current id0 and the quadrature axis target current iq0 may be obtained according to the formulas described below.

$$id0 = \frac{-\psi_f + \sqrt{\psi_f^2 + 8(L_q - L_d)^2 i_{s0}^2}}{4(L_q - L_d)} \quad (2)$$

$$iq0 = \text{sign}(i_{s0})\sqrt{i_{s0}^2 - id0^2} \quad (3)$$

$\Psi_f$ denotes the rotor flux linkage, and Lq and Ld denote quadrature axis inductance of the stator windings and direct axis inductance of the stator windings, respectively. is0 denotes the target current is0 generated by the first rotational speed loop 501 according to the target rotational speed n0 and the actual rotational speed n of the motor 58. A stator current space vector is0 and a stator flux linkage space vector Ts are in-phase, and the included angle θ is formed between the stator flux linkage Ψs and the rotor flux linkage (referring to FIG. 10).

The electromagnetic torque Te of the motor is calculated through the following formula:

$$Te = 1.5Pn[\Psi_f * iq + (Ld - Lq) * id * iq] \quad (4)$$

Figure 11:
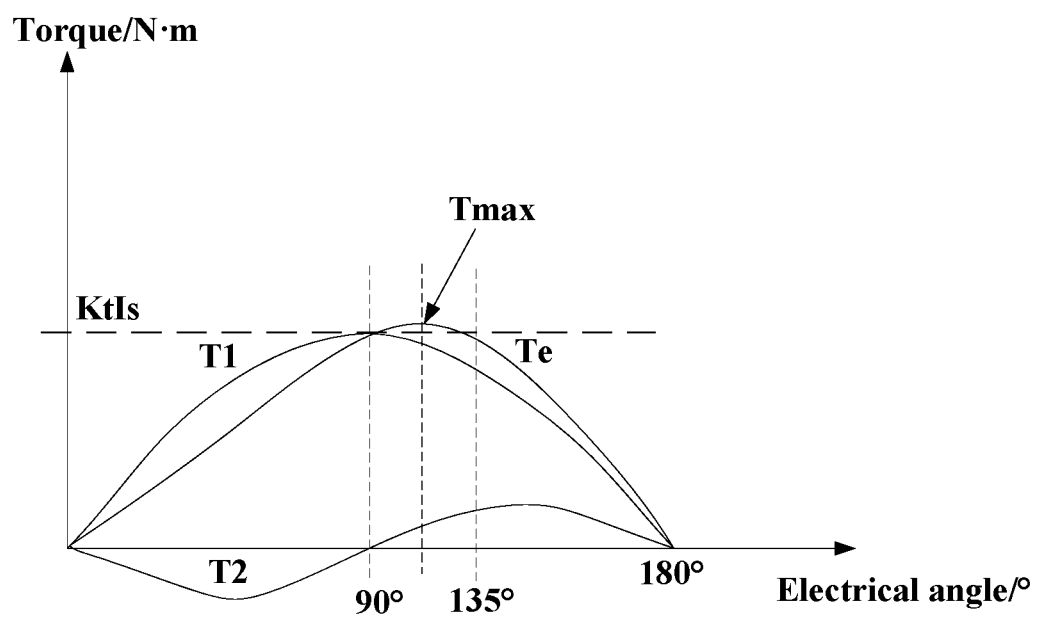
FIG. 11 is a graph illustrating relationships between permanent magnet torque T1, reluctance torque T2, and electromagnetic torque Te generated by the motor in FIG. 10 with the same current and an electrical angle.

The formula contains two items, where the former 1.5Pn$\Psi_f$*iq is permanent magnet torque T1 shown in a curve T1 in FIG. 11; the latter 1.5Pn (Ld−Lq)*id*iq is reluctance torque T2 shown in a curve T2 in FIG. 11; Te is formed by combining the curve T1 and the curve T2. It can be seen from FIG. 11, the combined electromagnetic torque Te has an approximate maximum value Tmax or a maximum value Tmax in the case where a corresponding torque angle is in a range of 90° to 135°. Therefore, optionally, the current distribution unit 502 distributes the quadrature axis target current iq0 and the direct axis target current id0 so that the included angle β between the stator flux linkage Ψs and the rotor flux linkage is in the range of 90° to 135°. In this manner, the electromagnetic torque Te is as large as possible so that the actual torque of the motor 58 can reach the target torque as soon as possible, increasing a speed corresponding to the torque of the motor 58, thereby making the rotational speed of the motor 58 reach or basically reach the target rotational speed n0 in a relatively short time.

In summary, the control module 50 can control the current applied to the stator by controlling the three-phase voltages Uu, Uv, and Uw applied to the motor 58 according to the rotational speed of the motor, the motor current, and the rotor position so that the stator windings generate the stator current space vector is0. The stator current space vector is0 and the stator flux linkage space vector Ts are in-phase, and the stator current space vector is0 is the target current is0. The target current is0 can be distributed by the current distribution unit 502 as the direct axis target current id0 and the quadrature axis target current iq0, and the control module 50 can control the angle between the stator flux linkage Ψs and the rotor flux linkage $\Psi_f$ by separately controlling a quadrature axis current iq and a direct axis current id so that the motor 58 can output relatively large electromagnetic torque Te, and thus the actual torque of the motor 58 can reach the target torque as soon as possible, increasing the speed corresponding to the torque of the motor 58, thereby making the rotational speed of the motor 58 reach or basically reach the target rotational speed n0 in a relatively short time.

The direct axis target current id0 and the quadrature axis target current iq0 distributed by the current distribution unit 502 according to the target current is0 can make the rotor of the motor 58 generate as large electromagnetic torque Te as possible so that the actual torque of the motor 58 can reach the target torque as soon as possible, and thus the rotational speed of the motor 58 can reach the target rotational speed n0 of the motor 58 set by the user through the operating device 15 as soon as possible, thereby improving a torque response speed and a rotational speed response speed of the motor 58.

The current conversion unit 507 is configured to acquire three-phase currents iu, iv, and iw and perform current conversion such that the three-phase currents iu, iv, and iw are converted into two-phase currents that are a direct axis actual current id and a quadrature axis actual current iq, respectively. The current detection module 57 is configured to transmit the detected three-phase currents iu, iv, and iw in actual operation of the motor 58 to the current conversion unit 507 in the control module 50. Optionally, the current conversion unit 507 includes Park conversion and Clark conversion.

The first current loop 503 is connected to the current distribution unit 502 and the current conversion unit 507 and configured to acquire the direct axis target current id0 and the direct axis actual current id to generate a first voltage adjustment quantity Ud according to the direct axis target current id0 and the direct axis actual current id, where the first voltage adjustment quantity Ud can make the direct axis actual current id approach the direct axis target current id0 as soon as possible. The first current loop 503 includes a comparison unit and an adjustment unit, where the adjustment unit may be a PI adjustment unit. The first current loop 503 is configured to compare he direct axis target current id0 with the direct axis actual current id and performing PI adjustment according to a comparison result to generate the first voltage adjustment quantity Ud.

The second current loop 504 is connected to the current distribution unit 502 and the current conversion unit 507 and configured to acquire the quadrature axis target current iq0 and the quadrature axis actual current iq to generate a second voltage adjustment quantity Uq according to the quadrature axis target current iq0 and the quadrature axis actual current iq, where the second voltage adjustment quantity Uq is used for making the quadrature axis actual current iq approach the quadrature axis target current iq0. The second current loop 504 includes a comparison unit and an adjustment unit, where the adjustment unit may be a PI adjustment unit. The second current loop 504 is configured to compare the quadrature axis target current iq0 with the quadrature axis actual current iq and performing PI adjustment according to a comparison result to generate the second voltage adjustment quantity Uq.

The first voltage adjustment quantity Ud and the second voltage adjustment quantity Uq need to be converted into control signals for controlling the driver circuit 53 after some conversions and calculations. The first voltage adjustment quantity Ud and the second voltage adjustment quantity Uq are sent to a control signal generation unit for conversion and calculation. In this example, the control signal generation unit includes the voltage conversion unit 505 and the PWM signal generation unit 506.

The voltage conversion unit 505 is connected to the first current loop 503 and the second current loop 504 and configured to acquire the first voltage adjustment quantity Ud, the second voltage adjustment quantity Uq, and a rotor position of the motor 58 from the rotor position detection module 56 and convert the first voltage adjustment quantity Ud and the second voltage adjustment quantity Uq into intermediate quantities Uα and Ub related to the three-phase voltages Uu, Uv, and Uw applied to the motor 58 to output the intermediate quantities Uα and Ub to the PWM signal generation unit 506. The PWM signal generation unit 506 is configured to generate, according to the intermediate quantities Uα and Ub, a PWM signal for controlling the switch elements of the driver circuit 53 so that the power supply 51 can output the three-phase voltages Uu, Uv, and Uw to be applied to windings of the motor 58, where Uu, Uv and Uw are three-phase symmetrical sine-wave voltages or saddle-wave voltages, and a phase difference between any two of the three-phase voltages Uu, Uv, and Uw is 120°. Optionally, the current conversion unit 505 includes Park conversion and Clark conversion.

Using the control module 50, this example adopts a control method described below.

The current conversion unit 507 is configured to acquire the three-phase currents iu, iv, and iw detected by the current detection module 57 and rotor position information of the rotor position detection module 56 and perform current conversion such that the three-phase currents iu, iv, and iw are converted into two-phase currents that are the direct axis actual current id and the quadrature axis actual current iq, respectively. The first current loop 503 is configured to acquire the direct axis target current id0 and the direct axis actual current id to generate the first voltage adjustment quantity Ud according to the direct axis target current id0 and the direct axis actual current id. The second current loop 504 is configured to acquire the quadrature axis target current iq0 and the quadrature axis actual current iq to generate the second voltage adjustment quantity Uq according to the quadrature axis target current iq0 and the quadrature axis actual current iq. The voltage conversion unit 505 is configured to acquire the first voltage adjustment quantity Ud, the second voltage adjustment quantity Uq, and a rotor position of the rotor position detection module 56 and convert the first voltage adjustment quantity Ud and the second voltage adjustment quantity Uq into the intermediate quantities Uα and Ub related to the three-phase voltages Uu, Uv, and Uw applied to the motor 58 to output the intermediate quantities Uα and Ub to the PWM signal generation unit 506. The PWM signal generation unit 506 is configured to, according to the intermediate quantities Uα and Ub, generate the PWM signal for controlling the switch elements of the driver circuit 53 so that the power supply 51 can output the three-phase voltages Uu, Uv, and Uw to be applied to the windings of the motor 58. Referring to FIGS. 15 and 16, in this example, the three-phase voltages Uu, Uv, and Uw are three-phase symmetrical sine-wave voltages (FIG. 15) or saddle-wave voltages (FIG. 16), and the phase difference between any two of the three-phase voltages Uu, Uv, and Uw is 120°.

In this process, the control module 50 outputs a control signal varying with the rotor position to perform dynamic adjustment and control on the voltage and/or current applied to the motor so that the motor 58 can obtain as large electromagnetic torque as possible at each rotor position. In this manner, the rotational speed of the motor 58 can reach the target rotational speed n0 of the motor 58 set by the user through the operating device 15 as soon as possible, thereby improving the response speed of the motor 58. Compared with the riding lawn mower 10 in the related art, the riding lawn mower 10 in the present application can make a response speed of output torque of the first motor 143 within 100 ms. In some examples, the response speed of the output torque of the first motor 143 is within 80 ms. In some examples, the response speed of the output torque of the first motor 143 is within 50 ms. In some examples, the response speed of the output torque of the first motor 143 is within 20 ms.

Correspondingly, the actual rotational speed of the first motor 143 can also reach or basically reach the target rotational speed in a relatively short time. Optionally, the actual rotational speed of the first motor 143 reaches or basically reaches the target rotational speed within a preset time, where the preset time is less than 800 ms. In some examples, the preset time is less than 600 ms. In some examples, the preset time is less than 300 ms.

Optionally, in the present application, the bus 59 and the target rotational speed detection module 54 are used so that a motor response speed of the riding lawn mower 10 in the present application can be improved, and the response speed of the output torque of the first motor 143 is within 10 ms.

Optionally, a communication frame rate of the bus has a range of 100 Hz to 2000 Hz. Optionally, the communication frame rate of the bus has a range of 200 Hz to 2000 Hz. Optionally, the communication frame rate of the bus has a range of 300 Hz to 3000 Hz.

In some examples, the communication frame rate of the bus has a range of 100 Hz to 1000 Hz. In some examples, the communication frame rate of the bus has a range of 200 Hz to 800 Hz. In some examples, the communication frame rate of the bus has a range of 100 Hz to 500 Hz. In some examples, the communication frame rate of the bus has a range of 500 Hz to 1000 Hz. In some examples, the communication frame rate of the bus has a range of 500 Hz to 1500 Hz. In some examples, the communication frame rate of the bus has a range of 1000 Hz to 2000 Hz. In some examples, the communication frame rate of the bus has a range of 1000 Hz to 1500 Hz. The communication frame rate of the bus 59 refers to the number of times the bus receives and/or sends data packets in one second.

The target rotational speed detection module 54 includes a sensor, and a data refresh rate of the sensor has a range of 50 μs/time to 10 ms/time. In some examples, the data refresh rate of the sensor has a range of 50 μs/time to 200 μs/time. In some examples, the data refresh rate of the sensor has a range of 100 μs/time to 300 μs/time. In some examples, the data refresh rate of the sensor has a range of 200 μs/time to 500 μs/time. In some examples, the data refresh rate of the sensor has a range of 100 μs/time to 1 ms/time. In some examples, the data refresh rate of the sensor has a range of 500 μs/time to 1 ms/time. In some examples, the data refresh rate of the sensor has a range of 1 ms/time to 10 ms/time.

In some other examples, the bus 59 may not be used, the control module 50 and the target rotational speed detection module 54 are connected through a common connection line, and the target rotational speed detection module 54 uses the sensor with the preceding data refresh rate. In this manner, the preceding control method is adopted so that the actual torque of the first motor can reach or basically reach the target torque within a first preset time, where the first preset time is less than 60 ms.

In some other examples, the target rotational speed detection module 54 uses a sensor with a normal data refresh rate, and the bus 59 uses the bus with the preceding communication frame rate. In this manner, the preceding control method is adopted so that the actual torque of the first motor can reach or basically reach the target torque within a first preset time, where the first preset time is less than 60 ms.

Figure 12:
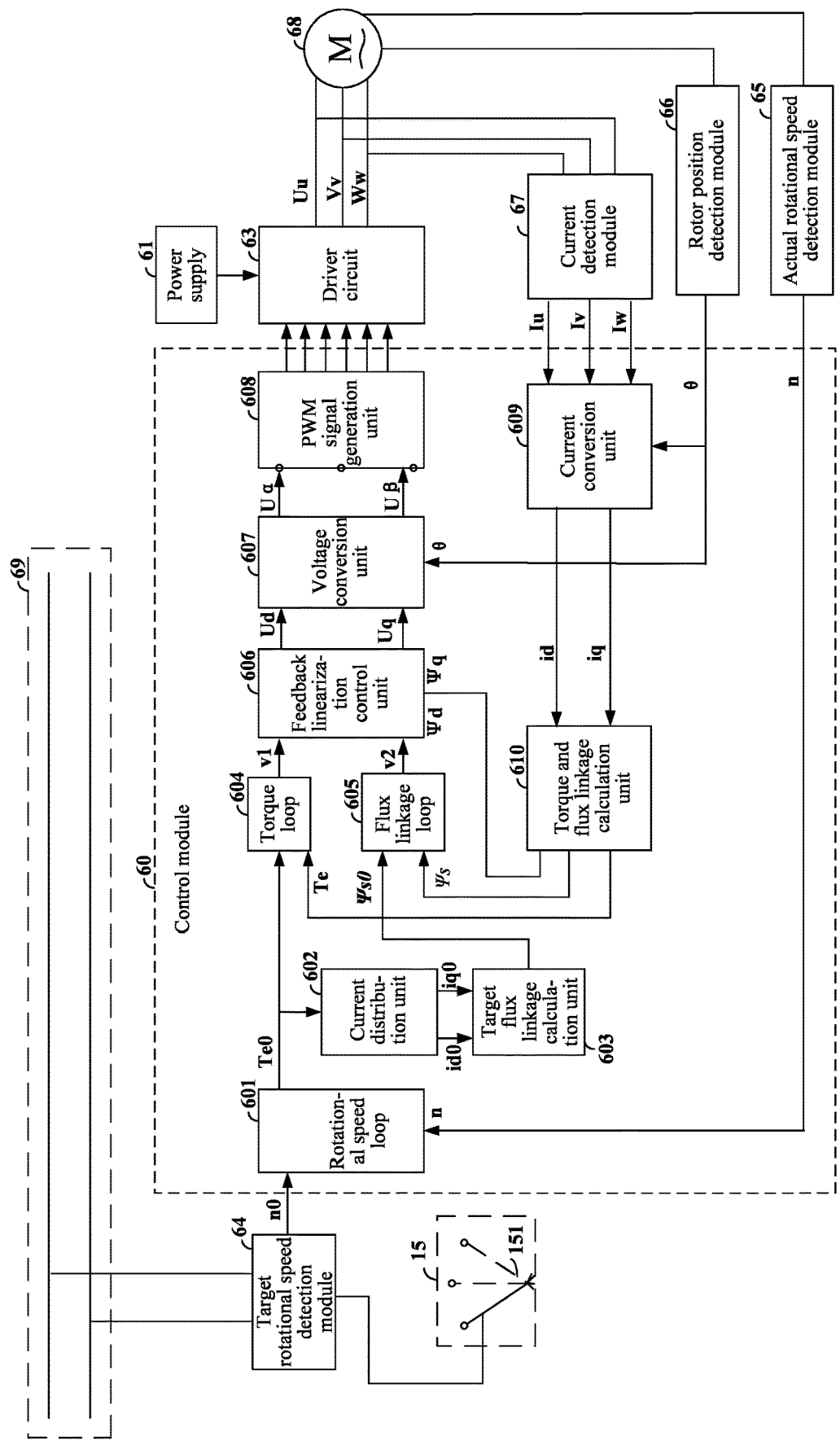
FIG. 12 is a block diagram of a control system of a first motor as another example.

Referring to FIG. 12, as another example of the control system of the first motor 143, the control system includes a control module 60, a power supply 61, a driver circuit 63, a target rotational speed detection module 64, an actual rotational speed detection module 65, a rotor position detection module 66, a current detection module 67, a motor 68, and a bus 69. The functions, structures, and compositions of the multiple assemblies in this example are the same as or similar to the functions, structures, and compositions of the multiple assemblies in the preceding example shown in FIG. 10, which is not repeated herein. The difference is that the control module 60 in this example includes a second rotational speed loop 601, a current distribution unit 602, a target flux linkage calculation unit 603, a torque loop 604, a flux linkage loop 605, a feedback linearization control unit 606, a voltage conversion unit 607, a PWM signal generation unit 608, a current conversion unit 609, and a torque and flux linkage calculation unit 610.

The second rotational speed loop 601 is associated with the target rotational speed detection module 64 and the actual rotational speed detection module 65. The second rotational speed loop 601 is configured to acquire a target rotational speed n0 of the motor 68 set by the user through the operating device 15 and detected by the target rotational speed detection module 64 and an actual rotational speed n of the motor 68 detected by the actual rotational speed detection module 65. The target rotational speed detection module 64 is associated with the operating device. In this example, the target rotational speed detection module 64 is associated with the operating lever 151 and configured to detect the position or the angle of rotation of the operating lever 151. The target rotational speed detection module 64 may adopt the position detection module shown in FIGS. 2 and 4.

The second rotational speed loop 601 is configured to generate target torque Te0 according to the target rotational speed n0 and the actual rotational speed n of the motor 68, where the target torque Te0 is electromagnetic torque Te0. Exemplarily, the second rotational speed loop 601 can generate the target torque Te0 through comparison and adjustment according to the target rotational speed n0 and the actual rotational speed n of the motor 68, and the target torque Te0 is used for making the actual rotational speed n approach the target rotational speed n0 as soon as possible. The second rotational speed loop 601 includes a comparison unit and an adjustment unit, where the adjustment unit may be a PI adjustment unit.

Figure 13:
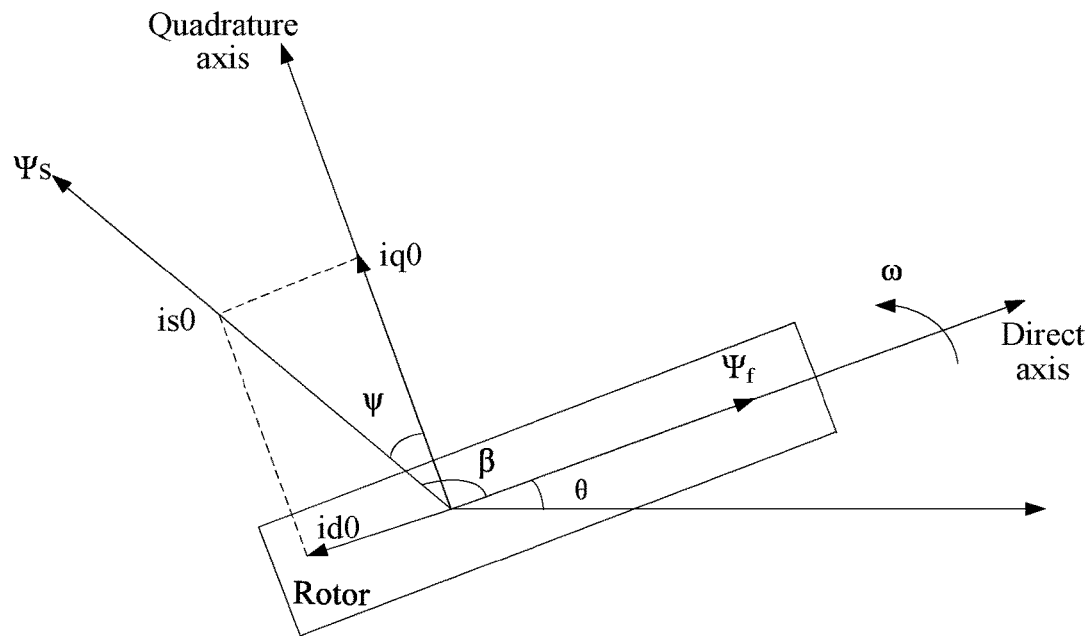
FIG. 13 is a space vector diagram of a motor under the control system of the first motor in FIG. 12.

The current distribution unit 602 is configured to distribute the direct axis target current id0 and the quadrature axis target current iq0 according to the output target torque Te0. Referring to FIG. 13, the direct axis target current id0 and the quadrature axis target current iq0 are vectors with directions and magnitudes, an electrical angle between the direct axis target current id0 and the quadrature axis target current iq0 is 90°, and the direct axis target current id0 and the quadrature axis target current iq0 are located on the direct axis and the quadrature axis, respectively. Optionally, the direct axis target current id0 and the quadrature axis target current iq0 may be obtained according to the formulas described below.

$$iq0 = \sqrt{\frac{\psi_f id0}{L_d - L_q} + id0^2} \quad (5)$$

$$Te0 = 1.5 p_n [\psi_f + (L_d - L_q)id0]\sqrt{\frac{\psi_f id0}{L_d - L_q} + id0^2} \quad (6)$$

$$|\psi_s| = \sqrt{(L_d id0 + \psi_f)^2 + (L_q iq0)^2} \quad (7)$$

Ψf denotes the rotor flux linkage, Ψs denotes the stator flux linkage, Lq and Ld denote the quadrature axis inductance of the stator windings and the direct axis inductance of the stator windings, respectively, and Pn denotes the number of magnetic pole pairs.

The target flux linkage calculation unit 603 can calculate a target stator flux linkage Ts0 according to the direct axis target current id0 and the quadrature axis target current iq0. In this manner, a control module 73 can directly perform dynamic adjustment on the stator flux linkage Ts and the electromagnetic torque Te0 so that the rotational speed of the motor can reach or basically reach the target rotational speed within a preset time range. The target stator flux linkage Ts0 may also be obtained in other manners, which is not limited to calculation by the target flux linkage calculation unit 603 in this example according to the direct axis target current id0 and the quadrature axis target current iq0.

Optionally, the control module 73 controls the angle β between the stator flux linkage Ψs and the rotor flux linkage Ψf to be 90°; optionally, the control module 73 controls the angle β between the stator flux linkage Ψs and the rotor flux linkage Ψf between 90° and 135° (referring to FIG. 13). In this manner, the motor 68 can obtain relatively large electromagnetic torque Te so that the actual rotational speed of the motor 68 can reach or basically reach the target rotational speed within a preset time range.

The target stator flux linkage Ts0 and the target torque Te0 are compared and adjusted with an actual stator flux linkage Ψs and actual torque Te, and a control signal is generated to adjust the actual stator flux linkage Ψs and the actual torque Te so as to make the actual stator flux linkage Ψs and the actual torque Te reach the target stator flux linkage Ts0 and the target torque Te0 as soon as possible.

Exemplarily, the current conversion unit 609 is configured to acquire the three-phase currents iu, iv, and iw detected by the current detection module 67 and a rotor position θ outputted by the rotor position detection module 66 and convert the three-phase currents iu, iv, and iw into two-phase actual currents that are the direct axis actual current id and the quadrature axis actual current iq, respectively, where the direct axis actual current id and the quadrature axis actual current iq are vectors with directions and magnitudes, and a direction of the direct axis actual current id and a direction of the quadrature axis actual current iq are perpendicular to each other.

The torque and flux linkage calculation unit 610 is configured to acquire the direct axis actual current id and the quadrature axis actual current iq from the current conversion unit 609 and generate the actual torque Te and the actual stator flux linkage Ψs according to the direct axis actual current id and the quadrature axis actual current iq. The actual torque Te is output to the torque loop 604 and the actual stator flux linkage Ψs is output to the flux linkage loop 605. In other examples, the actual torque Te and the actual stator flux linkage Ψs may also be obtained by direct detection.

The torque loop 604 is configured to acquire the actual torque Te calculated by the torque and flux linkage calculation unit 610 and the target torque Te0 outputted by a rotational speed loop 610 and generate a first adjustment quantity v1 according to the actual torque Te and the target torque Te0. The first adjustment quantity v1 is used for compensating the actual torque Te so that the actual torque Te approaches the target torque Te0. The torque loop 604 includes a comparison unit and an adjustment unit. Optionally, the adjustment unit may be a PI adjustment unit. The torque loop 604 is configured to compare the actual torque Te with the target torque Te0 and perform PI adjustment to obtain the first adjustment quantity v1.

The flux linkage loop 605 is configured to acquire the actual stator flux linkage Ts calculated by the torque and flux linkage calculation unit and the target stator flux linkage Ts0 generated by the target flux linkage calculation unit 603 and generate a second adjustment quantity v2 according to the actual stator flux linkage Ψs and the target stator flux linkage Ts0. The second adjustment quantity v2 is used for compensating the actual stator flux linkage Ψs so that the actual stator flux linkage Ψs approaches the target stator flux linkage Ts0. The flux linkage loop 605 includes a comparison unit and an adjustment unit. Optionally, the adjustment unit may be a PI adjustment unit. The flux linkage loop 605 is configured to compare the actual stator flux linkage Ψs with the target stator flux linkage Ψs0 and perform PI adjustment to obtain the second adjustment quantity v2.

The first adjustment quantity v1 and the second adjustment quantity v2 need to be converted into control signals for controlling the driver circuit 63 after some conversions and calculations. The first adjustment quantity v1 and the second adjustment quantity v2 are input to the control signal generation unit. In this example, optionally, the control signal generation unit includes the feedback linearization control unit 606, the voltage conversion unit 607, and the PWM signal generation unit 608.

The feedback linearization control unit 606 is configured to generate a voltage control quantity Uq and a voltage control quantity Ud in a direct axis-quadrature axis coordinate system according to the first adjustment quantity v1 generated by the torque loop 604, the second adjustment quantity v2 generated by the flux linkage loop 605, and a direct axis component Td and a quadrature axis component Tq of the actual stator flux linkage Ψs generated by the torque and flux linkage calculation unit 610.

The voltage conversion unit 607 is configured to acquire the voltage control quantity Uq and the voltage control quantity Ud and convert the voltage control quantity Uq and the voltage control quantity Ud into a voltage control quantity Uα and a voltage control quantity Uβ in an α-β coordinate system.

The PWM signal generation unit 608 is configured to generate a PWM control signal for controlling the driver circuit 63 according to the voltage control quantity Uα and the voltage control quantity Uβ in the α-β coordinate system so that the power supply 61 can output the three-phase voltages Uu, Uv, and Uw to be applied to the windings of the motor 68. In this example, Uu, Uv, and Uw are three-phase symmetrical sine-wave voltages or saddle-wave voltages, and the phase difference between any two of Uu, Uv, and Uw is 120°. Optionally, the three-phase voltages Uu, Uv, and Uw applied to the motor 68 make an angle between the stator flux linkage Ts0 and the rotor flux linkage Ψf be 90°. Optionally, the three-phase voltages Uu, Uv, and Uw applied to the motor 68 make the angle between the stator flux linkage Ts0 and the rotor flux linkage Ψf in a range of 90° to 135°.

In this manner, torque control is performed directly according to the electromagnetic torque Te and the stator flux linkage Ψs fed back actually so that a relatively fast torque response speed of the motor is obtained. In this example, an error is obtained through comparison between the given target torque and the given actual torque, an error is obtained through comparison between the given target stator flux linkage and the given actual stator flux linkage, an appropriate voltage vector is selected for control. Since the comparison is directly performed between the given torque and the given actual torque, the control effect in this example is determined by the actual torque. Therefore, a relatively fast torque response can be obtained so that the response speed of the output torque of the first motor 143 of the riding lawn mower 10 in this application is within 100 ms.

Optionally, in the present application, the bus 69 and the target rotational speed detection module 64 are used so that a motor response speed of the riding lawn mower 10 in the present application can be improved, and the response speed of the output torque of the first motor 143 is within 10 ms. The bus 69 and the target rotational speed detection module 64 are the same as the bus 59 and the target rotational speed detection module 54 in the preceding example.

In the preceding two examples, different control methods are used so that a relatively fast torque response of the motor can be obtained, the response speed of the output torque of the motor can be improved, and thus the actual torque of the first motor can reach or basically reach the target torque within a first preset time, where the first preset time is less than 100 ms. In this manner, the actual rotational speed of the first motor can reach or basically reach the target rotational speed within a preset time, where the preset time is less than 800 ms.

In this example, control signals outputted by the control modules (30, 50, 60) to the driver circuits (33, 53, 63) are control signals varying with rotor positions of the motors (38, 58, 68) so that input voltages and/or currents of the motors (38, 58, 68) vary with the rotor positions, and the input voltages and/or currents of the motors (38, 58, 68) vary in sine waves or saddle waves. In this manner, the motor has continuous and alternating current states on the three-phase stator windings in at least one electrical cycle or part of the electrical cycle. The current states on the three-phase stator windings can be combined into vector torques approximately moving continuously along a circumference. The rotor of the motor rotates synchronously with the vector torques approximately moving continuously along the circumference. Compared with a square wave control method in the related art in which only 6 discrete and discontinuous driving states are provided, a motor driving efficiency and a motor response speed can be improved in the present application. In the present application, the control module is configured to output the control signal to the driver circuit so that the input current or the input voltage of the first motor varies with the rotor position of the first motor, and thus the actual rotational speed of the first motor reaches or basically reaches the target rotational speed within a preset time, where the preset time is less than 100 ms.

In addition, in the present application, the buses (59, 69) and the target rotational speed detection modules (54, 64) are used so that a motor response speed of the riding lawn mower 10 in the present application can be improved, and the response speed of the output torque of the first motor 143 is within 10 ms.

In the preceding example, the position of the operating lever 151 corresponds to the speed of the first motor 143. When the user pushes the operating lever 151, the target rotational speed detection modules (54, 64) corresponding to the operating lever 151 output a detection signal to the control modules (30, 50, 60), where the detection signal corresponds to the current position of the operating lever 151. After the control module 30 receives the detection signal, the control module 30 obtains the target rotational speed of the first motor 151 corresponding to the operating lever 151 through a table look-up or calculation method according to the detection signal. In addition, the actual rotational speed detection modules (55, 65) feed back detection signals about the actual rotational speed of the first motor 143 detected by the control modules (50, 60), the control modules (50, 60) obtain the actual rotational speed of the first motor 143 according to the detection signals, and the control modules (50, 60) compare the obtained actual rotational speed of the first motor 143 with the target rotational speed to obtain an error and control a quadrature axis current vector and a direct axis current vector or control the stator flux linkage and torque according to the obtained error so that the first motor 143 can reach or basically reach the target rotational speed set by the user through the operating lever 151 within a preset time. In this process, the control modules (50, 60) constantly compare the target rotational speed of the first motor 143 with the actual rotational speed. The two control modules (50, 60) and the corresponding control processes are adopted so that the first motor 143 can reach or basically reach the target rotational speed set by the user through the operating lever 151 within a preset time which is a relatively short time.

Figure 14:
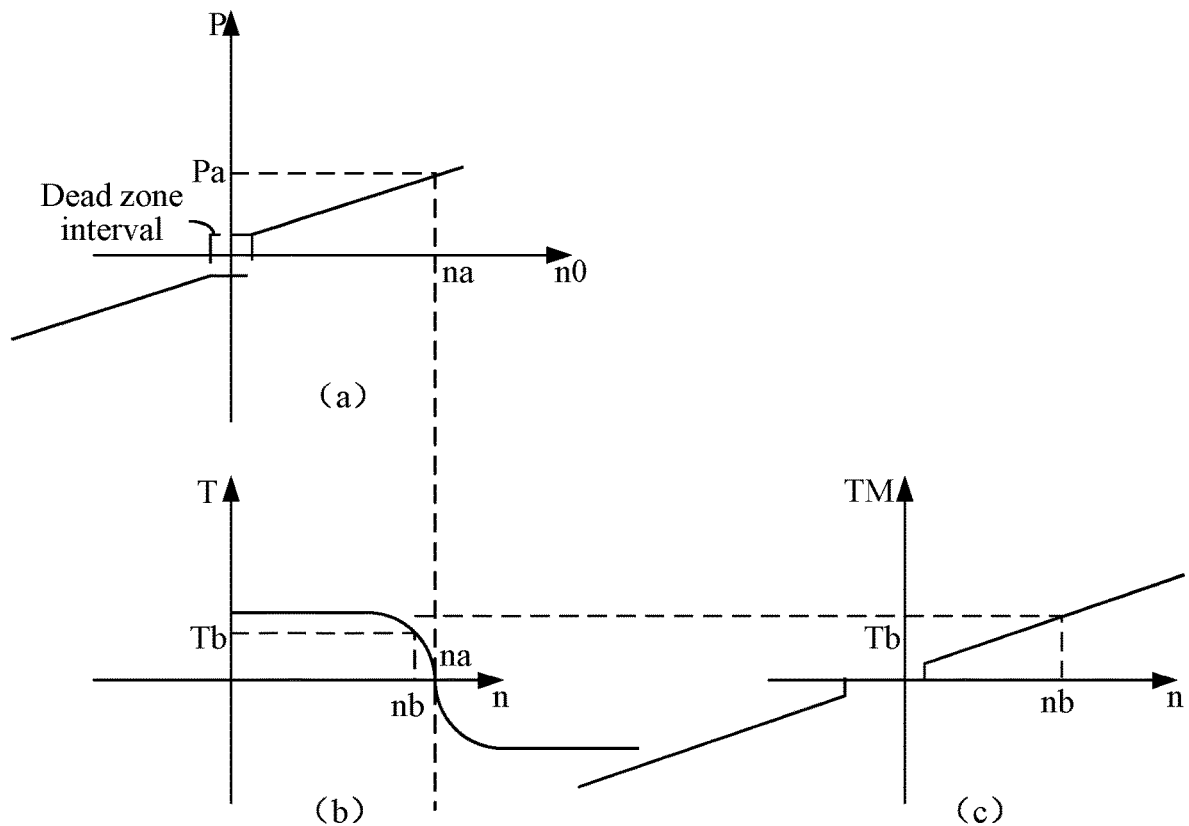
FIG. 14 illustrates a corresponding relationship between a position of an operating lever and a target rotational speed of a first motor, a corresponding relationship between an actual rotational speed and output torque of the first motor, and a corresponding relationship between the actual rotational speed and maximum output torque of the first motor.

As an example, a dead zone interval exists between an operating position of the operating device 15 and the target rotational speed of the first motor, where the target rotational speed of the first motor 143 is constant in the dead zone interval. Referring to FIG. 14, for the operating device 15 shown in FIGS. 2 to 4, the target rotational speed n0 of the first motor 143 is proportional to the operating position (such as an angle position P) of the operating lever 151, and the dead zone interval (such as a dotted line near a zero angle position in FIG. 14 (*a*)) is disposed near the zero angle position of the angle position P of the operating lever 151. In the dead zone interval, the target rotational speed of the first motor 143 is constant.

The dead zone interval indicates that the target rotational speed of the first motor 143 is constant when the operating lever 151 is pushed from the beginning to reaching a preset angle position Pa. Optionally, the target rotational speed of the first motor 143 is zero at this time, thereby prevent the first motor 143 from malfunctioning due to some jitters and causing safety accidents. Outside the dead zone interval, it may be considered that the position of the operating lever 151 at a certain angle position represents a certain target rotational speed n0 of the first motor 143.

In addition, referring to FIG. 14 (*c*), to prevent the user from accidentally pushing the operating lever 143 to exceed an allowable angle range, maximum output torque TM of the first motor 143 is set. When the operating lever 151 is at a certain angle position Pa, the target rotational speed n0 and the maximum output torque TM of the first motor 143 may be determined. That is, in the case where the operating lever 151 sets the target rotational speed, the target torque is also set, where the target torque is used for making the first motor 143 reach the target rotational speed as soon as possible.

As shown in FIG. 14 (*b*), the output torque T of the first motor 143 varies with the actual rotational speed n of the first motor 143 according to a curve. In the case where the actual rotational speed n of the first motor 143 is less than the target rotational speed n0, the output torque of the first motor should increase to accelerate the first motor 143, but the increased torque should not exceed the specified maximum torque TM of the first motor 143 at this angle. Similarly, if the actual rotational speed n of the first motor 143 is greater than the target rotational speed n0, the output torque T should be reduced to decelerate the first motor 143; if the actual rotational speed n of the first motor 143 is equal to the target rotational speed n0, output torque Ta of the first motor 143 is zero in this case.

The dead zone interval is provided so that the response speed of the first motor 143 is reduced. However, with the solution in the present application, even if the dead zone interval is provided, the response speed of the output torque of the first motor 143 can be made within 100 ms.

The operating device of the riding lawn mower 10 in the preceding example is not limited to the operating devices 15 that include operating levers 151 and are disposed on the left and right in the preceding example, and other operating devices may be used. For example, an operating device 75 of a riding lawn mower 70 is provided, where the operating device 75 includes a steering wheel 751 and a speed lever 752 (a throttle) so that the response speed of the output torque of the motor can be within 100 ms or within 40 ms. Optionally, the steering wheel 751 is an electronic steering wheel.

Other assemblies of the vehicle lawn mower 70 include a rack 71, a seat 72, a power output assembly 73, a running assembly 74, an operating device 75, and a power supply device 76. The structures, compositions, and functions of the rack 71, the seat 72, the power output assembly 73, the running assembly 74, and the power supply device 76 are the same as or similar to the structures, compositions, and functions of the assemblies in the riding lawn mower 10 in the preceding example, which is not repeated herein. The difference is that the operating devices are different. The operating device 75 of the vehicle lawn mower 70 is a combination of a steering wheel 751 and a speed lever 752 (a throttle). The speed of the left motor and the speed of the right motor are distributed through an angle of rotation of the steering wheel 751 and the speed given by the speed lever, so as to control the first running wheel 741 to move. Similar to the preceding example, a target speed is determined by a position of the speed lever 752 (the throttle), and the target speed is compared with an actual speed. The two control modules and the control methods in the preceding example are adopted so that the actual speed of the motor can quickly reach the target speed set by the speed lever 151, increasing the corresponding speed of the motor, thereby improving the user experience and the safety of the riding lawn mower.

What is claimed is:

1. A lawn care vehicle, comprising:
a rack;
a seat disposed above the rack and configured to support an operator;
a wheel set at least partially disposed below the rack and configured to drive the rack to move, wherein the wheel set comprises at least two driving wheels;
a running motor configured to drive at least one of the at least two driving wheels to rotate and comprising a stator and a rotor;
a supply device at least configured to supply a power source to the running motor;
an operating assembly at least partially disposed above the rack and configured to be operated by the operator to set a target state of the lawn care vehicle and one of a target rotational speed or a target torque of the running motor, wherein the target state comprises one of a forward state, a stop state, or a backward state;
a driver circuit electrically connected to the running motor and configured to distribute electric power of the supply device to multiphase windings on the stator in a preset logical relationship so that the running motor is capable of generating continuous torque;
a first detection device configured to detect an actual measured rotational speed of the at least one of the at least two driving wheels or the running motor in real time;
a current detection module configured to detect three-phase currents of the running motor; and
a control module configured to:
receive the actual measured rotational speed sent by the first detection device and the target rotational speed set by the operating assembly; and
based on the actual measured rotational speed of the at least one of the at least two driving wheels sent by the first detection device at a first preset time interval, one of the target rotational speed or the target torque set by the operating assembly, and a rotor position of the running motor, perform dynamic adjustment on currents applied to the multiphase windings to make the driver motor reach or basically reach the target torque set by the operating assembly within a preset time.

2. The lawn care vehicle of claim 1, wherein a duration of the preset time is less than or equal to 100 ms.

3. The lawn care vehicle of claim 1, wherein a duration of the preset time is less than or equal to 20 ms.

4. The lawn care vehicle of claim 1, further comprising a wiring harness system comprising a power cord and a bus;
wherein the first detection device, the operating assembly, a human-machine interface, and the control module are connected through the bus, and a communication frame rate of the bus has a value range of 100 Hz to 3000 Hz.

5. The lawn care vehicle of claim 1, wherein the operating assembly comprises a bracket fixedly installed above the rack, an operating lever configured to be capable of rotating around a first axis in a first direction at a forward position, a mid-gear position, and a backward position and rotating around a second axis in a second direction at an inner position and an outer position, and a pivoting combination for pivotably installing the operating lever on the bracket so that the operating lever is capable of rotating around the first axis in the first direction and rotating around the second axis in the second direction, the pivoting combination comprises a first pivoting assembly installed on the bracket and a second pivoting assembly installed on the first pivoting assembly, the first pivoting assembly allows the operating lever to rotate around the first axis in the first direction, the second pivoting assembly allows the operating lever to rotate around the second axis in the second direction, the first pivoting assembly comprises a first pivot fixed on the bracket and a sleeve that partially surrounds the first pivot and rotates around the first pivot, the second pivoting assembly comprises a second pivot fixedly installed on the first pivoting assembly, and the operating lever is pivotally installed on the second pivot.

6. The lawn care vehicle of claim 1, wherein the operating assembly comprises an operating device configured to be operated by the operator to set the target state of the lawn care vehicle and a human-machine interface disposed on a side of the seat and configured to be operated by the operator to set one of the target rotational speed or the target torque of the running motor, and the first detection device is connected to a bus; and the human-machine interface is connected to the bus.

7. The lawn care vehicle of claim 1, wherein the operating assembly comprises a steering wheel configured to distribute a speed to the running motor based on an angle of rotation and allow the operator to steer the lawn care vehicle, and a speed lever configured to set a target speed of the lawn care vehicle according to a current position, and the angle of rotation of the steering wheel and the current position of the speed lever are used for setting a target rotational speed of the lawn care vehicle.

8. The lawn care vehicle of claim 5, wherein the first detection device comprises a detection element fixed on the operating lever to move along with the operating lever and a detection sensor, the detection sensor and the detection element are spaced apart on the operating lever so that when the operating lever rotates around the first axis in the first direction, and the operating lever drives the detection element and the detection sensor to rotate relative to each other.

9. The lawn care vehicle of claim 1, wherein the control module comprises a first rotational speed loop, the first rotational speed loop configured to: acquire one of the target rotational speed or the target torque of the running motor set by the operating assembly, acquire the actual measured rotational speed detected in real time by the first detection device, and compare and adjust the target rotational speed of the running motor and the actual measured rotational speed to generate a target current vector that makes the actual measured rotational speed of the running motor approach the target rotational speed.

10. The lawn care vehicle of claim 9, wherein the control module further comprises a current distribution unit connected to the first rotational speed loop to decompose the target current vector into a direct axis target current in a same direction as a magnetic field direction of the rotor and a quadrature axis target current perpendicular to the magnetic field direction of the rotor.

11. The lawn care vehicle of claim 10, wherein the control module further comprises a current conversion unit configured to acquire the three-phase currents of the running motor and convert the three-phase currents of the running motor into a direct axis actual measured current and a quadrature axis actual measured current.

12. The lawn care vehicle of claim 11, wherein the control module further comprises a first current loop configured to acquire a direct axis target current outputted by a current distribution unit and a direct axis actual measured current outputted by a current conversion unit and compare the direct axis target current and the direct axis actual measured current to generate a first voltage adjustment quantity that makes the direct axis actual measured current approach the direct axis target current within a preset time, a second current loop configured to acquire a quadrature axis target current outputted by the current distribution unit and a quadrature axis actual measured current outputted by the current conversion unit and compare the quadrature axis target current and the quadrature axis actual measured current to generate a second voltage adjustment quantity that makes the quadrature axis actual measured current approach the quadrature axis target current within a preset time, and a signal generation unit configured to acquire the first voltage adjustment quantity, the second voltage adjustment quantity, and the rotor position and generate a pulse-width modulation (PWM) signal for driving the driver circuit according to the first voltage adjustment quantity, the second voltage adjustment quantity, and the rotor position to make the running motor reach or basically reach the target torque set by the operating assembly within a preset time.

13. The lawn care vehicle of claim 1, wherein an included angle between a stator flux linkage and a rotor flux linkage of the driver motor is between 90° and 135°.

14. The lawn care vehicle of claim 1, wherein the control module further comprises a torque loop configured to generate a first adjustment quantity according to the target torque and actual torque of the running motor, a flux linkage loop configured to generate a second adjustment quantity according to a target stator flux linkage and an actual stator flux linkage of the running motor, and a control signal generation unit configured to generate a control signal according to the first adjustment quantity and the second adjustment quantity, wherein the control signal is configured to control the driver circuit.

15. The lawn care vehicle of claim 1, further comprising a target rotational speed detection module associated with the operating assembly and configured to detect the target rotational speed of the running motor set by the operating assembly; wherein the target rotational speed detection module comprises a sensor, and a data refresh rate of the sensor has a range of 50 µs/time to 10 ms/time.

16. A riding lawn mower, comprising:
a rack;
a seat disposed above the rack and configured to support an operator;
a wheel set at least partially disposed below the rack and configured to drive the rack to move, wherein the wheel set comprises at least two driving wheels;
a running motor configured to drive at least one of the at least two driving wheels to rotate and comprising a stator and a rotor;
a power supply device at least configured to supply electric power to the running motor;
a driver circuit configured to load the electric power of the power supply device to the running motor;
an operating device configured to set at least one of target torque or a target rotational speed of the running motor; and
a control module configured to output a control signal to the driver circuit to make an input current or an input voltage of the running motor vary with a rotor position of the running motor and make an actual torque of the running motor reach or basically reach the target torque within a preset time.

17. The riding lawn mower of claim 16, wherein a duration of the preset time is less than or equal to 100 ms.

18. The riding lawn mower of claim 16, further comprising:
a target rotational speed detection module associated with the operating device and configured to detect the target rotational speed of the running motor set by the operating device.

19. The riding lawn mower of claim 16, wherein the target rotational speed detection module and the control module are connected through a bus, and a communication frame rate of the bus has a range of 100 Hz to 3000 Hz.

20. The riding lawn mower of claim 16, wherein an included angle between a stator flux linkage and a rotor flux linkage of the driver motor is between 90° and 135°.

* * * * *

UNITED STATES PATENT AND TRADEMARK OFFICE
CERTIFICATE OF CORRECTION

PATENT NO. : 11,999,240 B2
APPLICATION NO. : 17/556049
DATED : June 4, 2024
INVENTOR(S) : Dezhong Yang et al.

Page 1 of 1

It is certified that error appears in the above-identified patent and that said Letters Patent is hereby corrected as shown below:

On the Title Page

Item [30] Foreign Application Priority Data should read:
June 21, 2019 (CN) ................. 201910543909.4

Signed and Sealed this
Eighth Day of October, 2024

Katherine Kelly Vidal
*Director of the United States Patent and Trademark Office*